US012738637B2

(12) United States Patent
Cetinoneri et al.

(10) Patent No.: US 12,738,637 B2
(45) Date of Patent: Sep. 15, 2026

(54) RADIO FREQUENCY REMOTE HEAD FRONT-END CIRCUITRY SYSTEMS AND METHODS

(71) Applicant: Apple Inc., Cupertino, CA (US)

(72) Inventors: Berke Cetinoneri, Palo Alto, CA (US); Samia El Amrani, San Francisco, CA (US); Qishan Yu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/767,315

(22) Filed: Jul. 9, 2024

(65) Prior Publication Data

US 2024/0363999 A1 Oct. 31, 2024

Related U.S. Application Data

(60) Division of application No. 17/087,029, filed on Nov. 2, 2020, now Pat. No. 12,068,533, which is a (Continued)

(51) Int. Cl.
*H01Q 1/38* (2006.01)
*H01Q 1/22* (2006.01)
(Continued)

(52) U.S. Cl.
CPC ............. *H01Q 1/38* (2013.01); *H01Q 1/2283* (2013.01); *H04B 1/0458* (2013.01); *H04B 1/1607* (2013.01); *H04B 17/101* (2015.01)

(58) Field of Classification Search
CPC ............................... H01Q 1/38; H01Q 1/2283
See application file for complete search history.

(56) References Cited

U.S. PATENT DOCUMENTS 6,188,877 B1 2/2001 Boesch et al.
8,509,708 B2 8/2013 Zhang et al.
(Continued)

FOREIGN PATENT DOCUMENTS

CN 1578172 A 2/2005
CN 101124737 A 2/2008
(Continued)

OTHER PUBLICATIONS

Ping-Hsun Wu et al., "GaAs Bi-FET RF front-end MMIC for WIMAX applications"; 2012 IEEE Radio Frequency Integrated Circuits Symposium; dated Jul. 19, 2012; 4 pgs.
(Continued)

*Primary Examiner* — Graham P Smith
(74) *Attorney, Agent, or Firm* — FLETCHER YODER PC

(57) ABSTRACT

Techniques for implementing and/or operating a radio frequency system, which includes a logic board that outputs an analog electrical signal indicative of data to be wirelessly transmitted from the radio frequency system and a remote head. The remote head includes an antenna that generates an electromagnetic wave to facilitate wirelessly transmitting the data, an antenna integrated circuit implemented using a first semiconductor manufacturing technique, in which the antenna integrated circuit amplifies the analog electrical signal to generate a first amplified analog electrical signal, and a remote front-end integrated circuit coupled between the antenna integrated circuit and the antenna. The remote front-end integrated circuit is implemented using a second semiconductor manufacturing technique different from the first semiconductor manufacturing technique and amplifies the first amplified analog electrical signal based on a target output power of the antenna to generate a second amplified analog electrical signal indicative of the data.

20 Claims, 18 Drawing Sheets

Related U.S. Application Data continuation of application No. 16/368,535, filed on Mar. 28, 2019, now Pat. No. 10,826,169.

(60) Provisional application No. 62/788,047, filed on Jan. 3, 2019.

(51) Int. Cl.

| | |
|---|---|
| ***H04B 1/04*** | (2006.01) |
| ***H04B 1/16*** | (2006.01) |
| ***H04B 17/10*** | (2015.01) |

(56) References Cited

U.S. PATENT DOCUMENTS

| | | | | |
|---|---|---|---|---|
| 8,615,209 | B1 | 12/2013 | Khlat | |
| 10,277,259 | B2 | 4/2019 | Elláet al. | |
| 2005/0026647 | A1 | 2/2005 | Li et al. | |
| 2006/0223456 | A1 | 10/2006 | Ouzillou | |
| 2008/0293446 | A1 | 11/2008 | Rofougaran | |
| 2010/0113105 | A1 | 5/2010 | Xu et al. | |
| 2010/0177001 | A1 | 7/2010 | Alexopoulos et al. | |
| 2010/0210208 | A1 | 8/2010 | Gorbachov | |
| 2010/0291915 | A1 | 11/2010 | Nast et al. | |
| 2010/0311474 | A1 | 12/2010 | Donovan et al. | |
| 2012/0307695 | A1 | 12/2012 | Yehezkely et al. | |
| 2013/0107763 | A1 | 5/2013 | Uyehara et al. | |
| 2014/0256271 | A1 | 9/2014 | Kok | |
| 2015/0035545 | A1 | 2/2015 | Langer et al. | |
| 2016/0126619 | A1 | 5/2016 | Tenbroek et al. | |
| 2016/0226652 | A1* | 8/2016 | Moshfeghi | H04B 1/38 |
| 2016/0248379 | A1 | 8/2016 | Lehtola | |
| 2017/0094608 | A1 | 3/2017 | Langer et al. | |
| 2017/0099608 | A1 | 4/2017 | Lam et al. | |
| 2017/0373819 | A1 | 12/2017 | Liu et al. | |
| 2018/0262231 | A1 | 9/2018 | Pusl, III et al. | |
| 2018/0316383 | A1 | 11/2018 | Kamgaing et al. | |
| 2019/0245591 | A1 | 8/2019 | Liu et al. | |
| 2020/0274581 | A1 | 8/2020 | Staring et al. | |
| 2021/0234577 | A1 | 7/2021 | Liu et al. | |
| 2022/0416849 | A1 | 12/2022 | Liu et al. | |

FOREIGN PATENT DOCUMENTS

| | | | |
|---|---|---|---|
| CN | 103891160 | A | 6/2014 |
| CN | 104348438 | A | 2/2015 |
| CN | 107528598 | A | 12/2017 |
| CN | 207010689 | U | 2/2018 |
| JP | 2001332985 | A | 11/2001 |
| JP | 2008252418 | A | 10/2008 |
| JP | 2010239403 | A | 10/2010 |
| JP | 2017512019 | A | 4/2017 |
| KR | 20050103080 | A | 10/2005 |
| KR | 1020150122126 | A | 10/2015 |
| KR | 1020180010300 | A | 1/2018 |
| WO | 2015043829 | A1 | 8/2014 |

OTHER PUBLICATIONS

Zhang; "Design and Implementation of Radio Frequency Circuit in Short Wave Medium Frequency Digital Platform" Master of Engineering Thesis for University of Electronic Science and Technology of China; dated Sep. 15, 2018; 72 pgs.

David R. Pehlke et al., LTE-Advanced Pro RF Front-End Implementations to Meet Emerging Carrier Aggregation and DL MIMO Requirements, IEEE Communications Magazine • Apr. 2017, 8 pages.

* cited by examiner

RADIO FREQUENCY REMOTE HEAD FRONT-END CIRCUITRY SYSTEMS AND METHODS

CROSS-REFERENCE TO RELATED APPLICATION

This is a divisional of U.S. patent application Ser. No. 17/087,029, filed Nov. 2, 2020, which is a continuation of U.S. patent application Ser. No. 16/368,535, filed Mar. 28, 2019, now U.S. Pat. No. 10,826,169, which is claims priority to and benefit of U.S. Provisional Patent Application No. 62/788,047, filed Jan. 3, 2019, each of which is incorporated herein by reference in its entirety for all purposes.

BACKGROUND

The present disclosure generally relates to radio frequency systems and, more particularly, to front-end circuitry that may be implemented in a remote head (e.g., antenna module) of a radio frequency system along with one or more antennas.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often include a radio frequency system to facilitate wireless communication with another electronic device and/or a communication network, such as a Wi-Fi network and/or a cellular network. Generally, a radio frequency system may include an antenna and front-end circuitry, for example, implemented at least in part in a transceiver integrated circuit (IC). To facilitate wirelessly transmitting data, the front-end circuitry may generate an analog representation of the data as an analog electrical signal and the antenna may modulate electromagnetic (e.g., radio) waves based at least in part on the analog electrical signal. Additionally or alternatively, the antenna may output an analog representation of received (e.g., incident) electromagnetic waves as an analog electrical signal and the front-end circuitry may process the analog electrical signal, for example, to convert the analog electrical signal into a digital electrical signal to facilitate subsequent processing.

However, at least in some instances, an electronic device may be implemented such that its transceiver integrated circuit is located some distance away from an antenna, for example, when its radio frequency system includes multiple antennas implemented at disparate locations in the electronic device. In such instances, one or more electrical connectors, such as a wire, a cable, a conductive trace, and/or the like, may be coupled between the transceiver integrated circuit and the antenna. However, when an electrical signal is communicated (e.g., passed or transmitted) therethrough, an electrical connector generally introduces some amount of loss on the electrical signal, for example, due to its inherent impedance. Moreover, similar to an antenna, electromagnetic waves incident on an electrical connector may induce electrical current therein, which, at least in some instances, may introduce noise in an electrical signal concurrently being communicated through the electrical connector, for example, due to the induced electrical current distorting the electrical signal. In other words, when not properly accounted for, implementing one or more electrical connectors in a radio frequency system may affect (e.g., reduce) communication reliability (e.g., stability) provided by the radio frequency system and, thus, an electronic device in which the radio frequency system is implemented.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to radio frequency systems, which may be implemented in electronic devices to facilitate wireless data communication. More specifically, to facilitate improving communication reliability (e.g., stability), the present disclosure provides techniques for implementing and/or operating a remote head in a radio frequency system that includes one or more antennas. In some embodiments, a remote head may include an antenna circuit board and one or more antennas, for example, implemented using conductive material formed on a first (e.g., bottom) surface of the antenna circuit board.

Additionally, in some embodiments, a remote head may be coupled via one or more electrical connectors to a (e.g., main) logic board, for example, which includes a transceiver integrated circuit and/or a driver integrated circuit. In some words, in such embodiments, the one or more electrical connectors may enable the remote head and, thus, its one or more antennas to be positioned remotely from the logic board and, thus, the transceiver integrated circuit and/or the driver integrated circuit. Additionally, in such embodiments, the remote head and the logic board may communicate (e.g., analog electrical signals and/or digital electrical signals) via the one or more electrical connectors coupled therebetween.

However, an electrical connector generally introduces some amount of loss on an electrical signal passing therethrough, for example, due to its inherent impedance (e.g., resistance, capacitance, and/or inductance). In other words, communicating an analog electrical signal between the logic board and a remote head via one or more electrical connectors may introduce connector loss, which reduces magnitude (e.g., power) of the analog electrical signal. In fact, connector loss resulting from communication of an analog electrical signal to an antenna may reduce output power of a corresponding electromagnetic wave transmitted from the antenna, which, at least in some instances, may affect (e.g., reduce) communication reliability provided by a radio frequency system, for example, due to the actual output power differing from a target output (e.g., transmission) power and, thus, actual transmission distance different from a target transmission distance.

To facilitate improving communication reliability, in some embodiments, a radio frequency system may be implemented and/or operated to control output power of an antenna closer to the antenna, thereby reducing the distance an analog electrical signal, which is amplified to achieve the target output power, travels before reaching the antenna. In other words, in some embodiments, a remote head may be implemented and/or operated to control output power of one or more of its antennas. Generally, output power of an antenna is dependent on magnitude (e.g., amplitude) of an analog electrical signal supplied to the antenna.

Thus, to facilitate controlling output power, in some embodiments, a remote head may include one or more amplifier units, which each includes a selectively connectable transmit (e.g., power) amplifier and/or a selectively connectable receipt (low noise) amplifier. In other words, in such embodiments, a first portion of radio frequency front-end circuitry may be implemented on a transceiver-side of the one or more electrical connectors and a second portion of the radio frequency front-end circuitry may be implemented on an antenna-side of the one or more electrical connectors. Additionally, in some embodiments, the remote head may include routing circuitry, for example, which operates to route analog electrical signals between its antennas and its amplifier units and/or between its amplifier units and the one or more electrical connectors.

In fact, in some embodiments, routing circuitry and/or amplifier units to be included in a remote head may be implemented using one or more integrated circuit devices (e.g., chips or dies). For example, the remote head may include an antenna integrated circuit with antenna routing circuitry and one or more antenna amplifier units. Additionally or alternatively, the remote head may include a remote front-end integrated circuit with remote front-end routing circuitry and one or more remote front-end amplifier units. In other words, in some embodiments, the antenna integrated circuit and the remote front-end integrated circuit may be implemented as distinct (e.g., separate) integrated circuit devices coupled to an antenna circuit board of the remote head.

In some embodiments, implementing a remote head in this manner may enable the antenna integrated circuit and the transceiver integrated circuit to be implemented (e.g., manufactured) using different semiconductor manufacturing techniques, for example, which provide varying tradeoffs. As an illustrative example, the antenna integrated circuit may be implemented using bulk complementary metal-oxide-semiconductor (CMOS) manufacturing techniques to facilitate reducing implementation associated cost (e.g., physical footprint), for example, since bulk CMOS manufacturing techniques may be more readily available compared to other semiconductor manufacturing techniques. On the other hand, the remote front-end integrated circuit may be implemented using a different semiconductor manufacturing technique, such as a radio frequency silicon-on-insulator (RF-SOI) manufacturing technique, to facilitate improving operational efficiency and/or communication reliability, for example, since amplifiers implemented using the different semiconductor manufacturing technique may exhibit better performance (e.g., reduced power consumption and/or improved linearity) compared to amplifiers implemented using bulk CMOS manufacturing techniques.

In other words, more generally, implementing a remote head using multiple integrated circuit devices may enable the remote front-end integrated circuit to be implemented (e.g., manufactured) at least in part using a semiconductor manufacturing technique that provides radio frequency performance, which facilitates meeting (e.g., satisfying) system-level specifications (e.g., requirements). In particular, implementing a remote head in this manner may enable amplification (e.g., gain) applied in the remote head to be divided between its antenna integrated circuit and its remote front-end integrated circuit. For example, while a radio frequency system is operating in a transmission mode, remote front-end amplifier unit in the remote front-end integrated circuit may connect its transmission (e.g., power) amplifier, thereby enabling the remote front-end amplifier unit to (e.g., further) amplify an analog electrical signal received from the antenna integrated circuit and output the amplified analog electrical signal to an antenna. Leveraging the improved amplifier performance of the remote front-end integrated circuit, in some embodiments, a remote head may be implemented and/or operated to apply significantly more gain via its remote front-end integrated circuit compared to its antenna integrated circuit.

As such, in some embodiments, a remote head may be operated to control output power of one or more of its antennas at least in part by controlling (e.g., adjusting) gain applied by one or more remote front-end amplifier units in its remote front-end integrated circuit. To facilitate controlling output power, in some embodiments, the remote front-end integrated circuit may additionally include one or more power sensors, for example, each coupled to a transmit (e.g., power) amplifier in a corresponding remote front-end amplifier unit via bi-directional coupler circuitry. In other words, in some embodiments, a controller (e.g., control circuitry) of a radio frequency system may determine expected output power of the radio frequency system based at least in part on sensor data indicative of magnitude of amplified analog electrical signals output from the remote front-end amplifier units and adjust the gain to be applied by one or more of the remote front-end amplifier units when the expected output power and a target output power differ by more than a difference threshold.

As described above, to implement a remote head, a remote front-end integrated circuit and/or other integrated circuit devices, such as an antenna integrated circuit, may be communicatively coupled to an antenna circuit board on which one or more antennas are implemented. In this manner, a remote front-end integrated circuit and/or an antenna integrated circuit may communicate with the one or more antennas and, thus, operate to amplify analog electrical signals communicated with the one or more antennas. However, at least in some instances, different electronic devices and/or different radio frequency systems may employ different antenna configurations, for example, due to size and/or form factor constraints.

In some embodiments, remote heads implemented to support different antenna configurations may nevertheless include common circuitry features. To facilitate improving deployment flexibility, in some embodiments, one or more of the common circuitry features may be implemented in a system-in-package (SiP), which may be coupled to an antenna circuit board of a remote head. For example, a remote head system-in-package may include an antenna integrated circuit to be included in a remote head. Additionally or alternatively, a remote head system-in-package may include an antenna integrated circuit and a remote front-end integrated circuit. Furthermore, in some embodiments, a remote head system-in-package may include an antenna integrated circuit and two remote front-end integrated circuits.

In particular, in some embodiments, a system-in-package may include a SiP circuit board with pins (e.g., terminals) formed its first (e.g., bottom) surface. Additionally, the system-in-package may include one or more integrated circuit devices, such as an antenna integrated circuit and/or a remote front-end integrated circuit, coupled to a second (e.g., top) surface of the SiP circuit board. In other words, the antenna integrated circuit and/or the remote front-end integrated circuit may be communicatively coupled to the pins via conductive traces and/or vias formed in the SiP circuit board.

To enable communication with antennas formed on its first (e.g., bottom) surface, an antenna circuit board may include pads (e.g., terminals) formed on a second (e.g., top) surface to interface with the pins of the SiP circuit board. As such, by coupling the system-in-package to the antenna circuit board, the pins on the SiP circuit board and, thus, an antenna integrated circuit and/or a remote front-end integrated circuit coupled to the SiP circuit board may be communicatively coupled to the antennas via conductive traces and/or vias formed in the antenna circuit board. In fact, in some embodiments, the same system-in-package design may be used in remote heads implemented to support different antenna configurations, for example, merely by adjusting routing circuitry in an antenna circuit board coupled thereto.

In addition to improving deployment flexibility, in some embodiments, implementing an antenna integrated circuit and/or a remote front-end integrated circuit in a system-in-package may facilitate reducing implementation associated cost, for example, by enabling a reduction in physical footprint (e.g., size). In particular, in some embodiments, a system-in-package may include its own electromagnetic shielding (e.g., electromagnetic shield can) to block electromagnetic interference from reaching electrical conductive material implemented therein. At least in some instances, implementing the system-in-package with its own electromagnetic shielding may obviate implementing additional and/or separate electromagnetic shielding around the antenna circuit board and/or the remote head as a whole. In this manner, the techniques described in the present disclosure may facilitate improving implementation flexibility, implementation associated cost, communication reliability, and/or operational efficiency of radio frequency systems and, thus, electronic devices in which the radio frequency systems are deployed.

BRIEF DESCRIPTION OF THE DRAWINGS

Various aspects of the present disclosure may be better understood upon reading the following detailed description and upon reference to the drawings in which.

DETAILED DESCRIPTION

Figure 1:
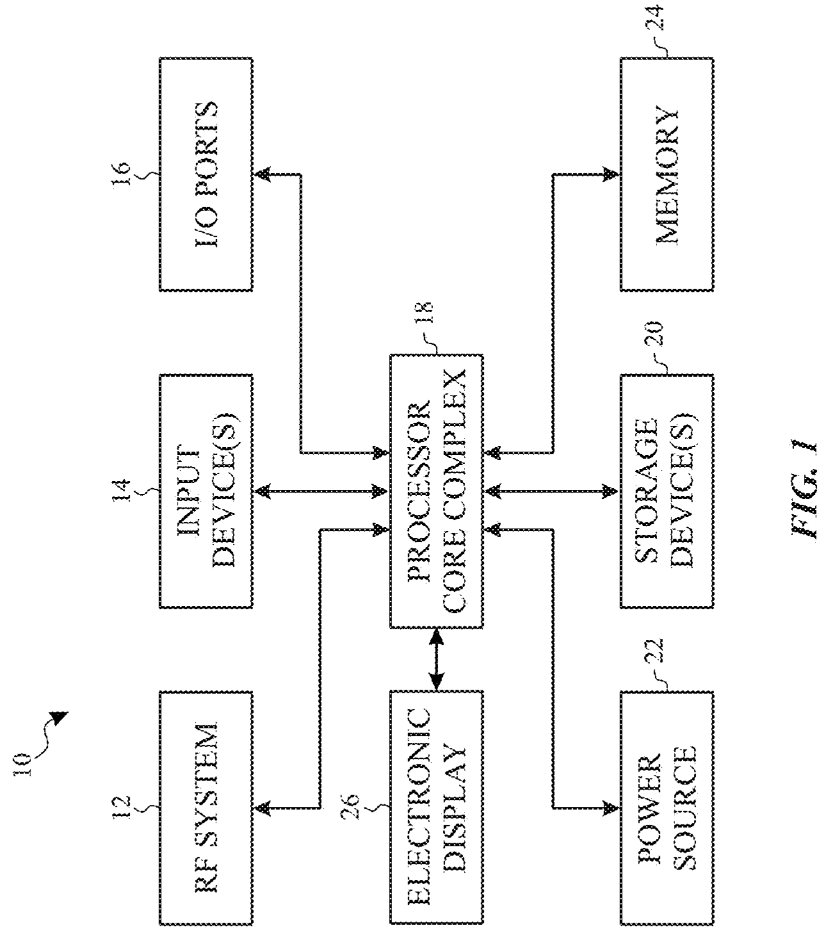
FIG. 1 is a block diagram of an electronic device including a radio frequency system, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency systems, which may be implemented in electronic devices to facilitate wireless communication. For example, a radio frequency system may facilitate wireless data communication between electronic devices. Additionally or alternatively, a radio frequency system may facilitate wireless data communication between an electronic device and a communication network, such as a Bluetooth network, a Wi-Fi network, and/or a cellular (e.g., LTE, 5G, or millimeter wave) network.

Different types of communication networks often utilize different communication protocols and/or different communication (e.g., transmission and/or reception) frequencies (e.g., bands or channels). For example, a long-term evolution (LTE) communication network may utilize a lower communication frequency, such as an 850 MHz band, a 1900 MHz band, and/or a 2100 MHz band. On the other hand, a millimeter wave (mmWave) communication network (e.g., a 5G mmWave communication network) may utilize a higher communication frequency, such as a 28 GHz band (e.g., 24.25-29.5 GHz), a 38 GHz band (e.g., 37-43.5 GHz), and/or a 60 GHz band (e.g., 54-71 GHz). Additionally or alternatively, a millimeter wave communication network may support signal polarization, for example, to enable a first data stream to be communicated using horizontal polarization and a second (e.g., different) data stream to be concurrently communicated using vertical polarization.

Nevertheless, to facilitate wireless communication, radio frequency systems generally include at least one antenna and front-end circuitry, for example, implemented at least in part in a transceiver integrated circuit (IC). As such, operation of radio frequency systems to wirelessly communicate data may be generally similar. For example, based at least in part on received (e.g., incident) electromagnetic (e.g., radio) waves corresponding with first data, an antenna implemented in a radio frequency system may output an analog representation of the first data to front-end circuitry of the radio frequency system as a first analog electrical signal. Based at least in part on the first analog electrical signal, the front-end circuitry may generate a digital representation of the first data as a first digital electrical signal, thereby wirelessly receiving the first data.

Additionally or alternatively, to wirelessly transmit second data, a radio frequency system may supply a digital representation of the second data to its front-end circuitry as a second digital electrical signal. Based at least in part on the second digital electrical signal, the front-end circuitry may generate an analog representation of the second data as a second analog electrical signal. An antenna coupled to the front-end circuitry may then modulate electromagnetic (e.g., radio) waves based at least in part on the second analog electrical signal, thereby wirelessly transmitting the second data.

Generally, output (e.g., transmission) power of an electromagnetic wave transmitted from an antenna may be dependent on magnitude (e.g., power) of a corresponding analog electrical signal supplied to the antenna. For example, output power of the electromagnetic wave transmitted from the antenna may increase as the magnitude of the analog electrical signal supplied to the antenna increases. Additionally, an electromagnetic wave generally loses power the farther it propagates (e.g., travels). In other words, the output power of electromagnetic waves transmitted from a radio frequency system may affect transmission distance and, thus at least in some instances, communication reliability (e.g., stability) provided by the radio frequency system.

To facilitate improving communication reliability, front-end circuitry in a radio frequency system may operate to amplify analog electrical signals, for example, before the analog electrical signals are used to transmit corresponding electromagnetic waves and/or before the analog electrical signals are converted into corresponding digital electrical signals. For example, the front-end circuitry may include one or more amplifier units, which each includes a selectively connectable transmit (e.g., power) amplifier and a selectively connectable receipt (e.g., low noise) amplifier. In other words, an amplifier unit implemented in the front-end circuitry may amplify analog electrical signals output from an antenna when its receipt amplifier is connected and amplify analog electrical signals to be supplied to the antenna when its transmit amplifier is connected.

However, operating an amplifier to amplify an analog electrical signal generally consumes electrical power and, thus, affects operational efficiency of the radio frequency system. In fact, the amount of electrical power consumed generally increase as the gain (e.g., amount of amplification) applied to analog electrical signals increases. In other words, at least in some instances, amplification applied by front-end circuitry of a radio frequency system may result in a tradeoff between communication reliability and operational efficiency (e.g., power consumption) of the radio frequency system and, thus, an electronic device in which the radio frequency system is deployed.

Accordingly, to facilitate optimizing (e.g., balancing) communication reliability and operational efficiency, the present disclosure describes techniques for implementing and/or operating a radio frequency system with multiple antennas, which may be positioned at disparate locations in an electronic device. For example, the radio frequency system may include a first antenna positioned at a first (e.g., top) end of an electronic device and a second antenna positioned at a second (e.g., bottom or opposite) end of the electronic device. Additionally or alternatively, the radio frequency system may include a third antenna positioned along a first (e.g., front glass) surface of the electronic device while the first antenna and/or the second antenna are positioned along a second (e.g., back glass or opposite) surface of the electronic device.

Moreover, in some embodiments, multiple antennas in a radio frequency system may be implemented to enable communication with the same type of communication network. For example, the first antenna, the second antenna, and the third antenna may each be implemented to enable wireless data communication with a millimeter wave communication network. Thus, in some embodiments, the radio frequency system may communicate with a communication network via a subset of antennas, which, at least in some instances, may facilitate improving or at least maintaining communication reliability while reducing power consumption. For example, when the first antenna is more obstructed from a millimeter wave communication network (e.g., by a user's hand), the radio frequency system may communicate with the millimeter wave communication network via the second antenna and/or the third antenna instead of simply increasing amplification applied by its front-end circuitry to overcome the obstruction to wireless data communication via the first antenna.

As described above, front-end circuitry in a radio frequency system may be implemented at least in part in a transceiver integrated circuit (e.g., device, chip, or die). For example, the transceiver integrated circuit (IC) may include an analog-to-digital converter (ADC) and/or a digital-to-analog converter (DAC). However, when a radio frequency system includes multiple antennas positioned at disparate locations, in some embodiments, its transceiver integrated circuit and, thus, a (e.g., main) logic board on which the transceiver integrated circuit is implemented may be separated from one or more of its antennas by some distance. In other words, in such embodiments, the one or more antennas may be remote from the logic board and, thus, circuitry implemented on the logic board.

To facilitate positioning an antenna remotely in an electronic device, in some embodiments, the antenna may be implemented in a remote head (e.g., antenna module or unit). For example, a remote head may include an antenna circuit board, such as a printed circuit board (PCB), and one or more antennas implemented using conductive material formed on the antenna circuit board. In other words, in some embodiments, a radio frequency system may include multiple remote heads positioned at disparate locations in the electronic device. For example, a first remote head including the first antenna may be positioned at the first (e.g., top) end of the electronic device and a second remote head including the second antenna may be positioned at the second (e.g., bottom or opposite) end of the electronic device. Additionally or alternatively, a third remote head including the third antenna may be positioned along the first (e.g., front or cover glass) surface of the electronic device while the first remote head and/or the second remote head are positioned along the second (e.g., back glass or opposite) surface of the electronic device.

To facilitate further improving communication reliability, in some embodiments, a remote head may include multiple antennas, for example, to facilitate implementing an antenna array. As an illustrative example, in some embodiments, the first remote head and/or the second remote head may each include four antennas. Additionally or alternatively, the second remote head and/or the third remote head may each include two antennas. In some embodiments, implementing an antenna array in a radio frequency system may facilitate improving communication reliability by enabling the radio frequency system to implement beam forming techniques, for example, by supplying phase shifted versions of an analog electrical signal to different antennas in the antenna array such that additive and/or destructive interference in resulting electromagnetic waves produce one or more electromagnetic wave beams (e.g., concentrated strength) oriented in a target direction (e.g., cell tower or access point).

As described above, in some embodiments, a remote head and, thus, an antenna of the remote head may be separated from a (e.g., main) logic board and, thus, a transceiver integrated circuit implemented on the logic board by some distance. Accordingly, in such embodiments, one or more electrical connectors (e.g., conductive traces, wires, and/or cables) may be coupled between the transceiver integrated circuit and the antenna. For example, when the first remote head and the second remote head are positioned at opposite ends of an electronic device, the logic board including the transceiver integrated circuit may be positioned at a more central location in the electronic device. Additionally, the logic board and, thus, the transceiver integrated circuit may be communicatively coupled to the first remote head via a first one or more electrical connectors and communicatively coupled to the second remote head via a second one or more electrical connectors.

However, an electrical connector generally introduces some amount of loss on an electrical signal passing therethrough, for example, due to its inherent impedance (e.g., resistance, capacitance, and/or inductance). In other words, communicating an analog electrical signal between the transceiver integrated circuit and an antenna via one or more electrical connectors may introduce connector loss, which reduces magnitude (e.g., power) of the analog electrical signal. In fact, connector loss resulting from communication of an analog electrical signal to an antenna may reduce output power of a corresponding electromagnetic wave transmitted from the antenna, which, at least in some instances, may affect (e.g., reduce) communication reliability provided by the radio frequency system, for example, due to the actual output power differing from a target output (e.g., transmission) power and, thus, actual transmission distance different from a target transmission distance.

To facilitate improving communication reliability, in some embodiments, a radio frequency system may be implemented and/or operated to control output power of an antenna closer to the antenna, thereby reducing the distance an analog electrical signal, which is amplified to achieve a target output power, travels before reaching the antenna. To amplify analog electrical signals, as described above, front-end circuitry may include one or more amplifier units, which each includes a selectively connectable transmit (e.g., power) amplifier and/or a selectively connectable receipt (e.g., low noise) amplifier. Additionally, as described above, one or more antennas may be implemented in a remote head.

Accordingly, to facilitate controlling output power closer to an antenna, in some embodiments, one or more amplifier units may be implemented in a corresponding remote head. As described above, in some embodiments, a remote head may include an antenna circuit board, such as a printed circuit board (PCB), and one or more antennas implemented by conductive material formed on the antenna circuit board. In such embodiments, one or more amplifier units and/or other front-end circuitry, such as routing circuitry and/or phase shift circuitry, may be implemented in one or more integrated circuit devices (e.g., chips or dies) coupled to a (e.g., top) surface of the antenna circuit board. In other words, in such embodiments, the one or more integrated circuit devices and, thus, the remote head may be implemented at least in part using one or more semiconductor manufacturing techniques.

Generally, different semiconductor manufacturing techniques may provide varying tradeoffs. For example, an integrated circuit implemented using bulk complementary metal-oxide-semiconductor (CMOS) manufacturing techniques may be suitable for processing digital electrical signals, suitable for routing analog electrical signals, and/or more readily available compared to integrated circuits implemented using other semiconductor manufacturing techniques, such as a radio frequency (RF) silicon-on-insulator (SOI) manufacturing technique, a gallium arsenide (GaA) manufacturing technique, a silicon-germanium (SiGe) BiCMOS manufacturing technique, a gallium nitride (GaN) manufacturing technique, another embedded passive manufacturing technique, or a surface mounted technology (SMT) manufacturing technique. However, an integrated circuit implemented using other semiconductor manufacturing techniques may provide better amplifier performance (e.g., improved linearity and/or reduced power consumption), but increase implementation associated cost (e.g., physical footprint) compared to integrated circuits implemented using bulk CMOS manufacturing techniques, for example, due to the addition of one or more embedded passive layers and/or the availability of alternative semiconductor materials (e.g., gallium arsenide and/or gallium nitride) compared to silicon.

Leveraging the tradeoffs, in some embodiments, front-end circuitry in a radio frequency system may be implemented using multiple different semiconductor manufacturing techniques. In other words, in some embodiments, front-end circuitry on a transceiver-side of an electrical connector may be implemented using multiple integrated circuit devices (e.g., chips or dies). For example, front-end circuitry implemented on the (e.g., main) logic board may include a transceiver integrated circuit, which is implemented using a first semiconductor manufacturing technique, and a driver integrated circuit, which is implemented at least in part using a second (e.g., different) semiconductor manufacturing technique. Additionally or alternatively, front-end circuitry on an antenna-side of an electrical connector may be implemented using multiple integrated circuits devices (e.g., chips or dies). For example, in addition to one or more antennas, a remote head may include an antenna integrated circuit (IC), which is implemented using a first semiconductor manufacturing technique, and a remote front-end integrated circuit, which is implementing at least in part using a second (e.g., different) semiconductor manufacturing technique.

In some embodiments, an antenna integrated circuit may include routing circuitry implemented and/or operated to route analog electrical signals. For example, the routing circuitry may include one or more switching devices, filtering circuitry, splitter circuitry, and/or combiner circuitry. As described above, bulk CMOS integrated circuits may be suitable for routing analog electrical signals. Thus, in some embodiments, the antenna integrated circuit may be implemented using bulk CMOS manufacturing techniques to facilitate reducing implementation associated cost, such as component count, physical footprint, and/or manufacturing steps.

Additionally, in some embodiments, an antenna integrated circuit may include one or more amplifier units. However, as described above, at least in some instances, an amplifier implemented using bulk CMOS manufacturing techniques may exhibit worse amplifier performance (e.g., linearity and/or power consumption) compared to an amplifier implemented using other semiconductor manufacturing techniques. Thus, to facilitate improving operational efficiency (e.g., reducing power consumption), one or more amplifier units may be included in the remote front-end integrated circuit and implemented at least in part using a semiconductor manufacturing technique other than the bulk CMOS manufacturing technique, such as a radio frequency silicon-on-insulator (RF-SOI) manufacturing technique.

In other embodiments, the remote front-end integrated circuit and the antenna integrated circuit of a remote head may be implemented in part using the same semiconductor manufacturing technique. For example, a first portion of the remote front-end integrated circuit may be also be implemented using bulk CMOS manufacturing techniques and, thus, include a bulk CMOS die. To facilitate improving radio frequency performance, a second portion of the remote front-end integrated circuit may include an embedded passive and/or a surface mounted device (SMD) or component coupled to the bulk CMOS die.

In other words, more generally, implementing a remote head using multiple integrated circuit devices may enable the remote front-end integrated circuit to be implemented (e.g., manufactured) at least in part using a semiconductor manufacturing technique that provides radio frequency performance, which facilitates meeting (e.g., satisfying) system-level specifications (e.g., requirements). In particular, implementing a remote head in this manner may enable amplification (e.g., gain) applied in the remote head to be divided between its antenna integrated circuit and its remote front-end integrated circuit. For example, while the radio frequency system is operating in a reception mode, an amplifier unit in the remote front-end integrated circuit may connect its receipt (e.g., low noise) amplifier, thereby enabling the remote front-end amplifier unit to amplify an analog electrical signal received from an antenna and output the amplified analog electrical signal to the antenna integrated circuit (e.g., for further amplification).

On the other hand, while the radio frequency system is operating in a transmission mode, an amplifier unit in the remote front-end integrated circuit may connect its transmission (e.g., power) amplifier, thereby enabling the remote front-end amplifier unit to (e.g., further) amplify an analog electrical signal received from the antenna integrated circuit and output the amplified analog electrical signal to an antenna. Leveraging the improved amplifier performance of the remote front-end integrated circuit, in some embodiments, a remote head may be implemented and/or operated to apply significantly more gain via its remote front-end integrated circuit compared to its antenna integrated circuit. For example, while the radio frequency system is operating in the transmission mode, the gain applied in the remote front-end integrated circuit may be one or more orders of magnitude greater than the gain applied in the antenna integrated circuit.

As such, in some embodiments, a remote head may be operated to control output power of a radio frequency system at least in part by controlling (e.g., adjusting) gain applied by one or more amplifier units in its remote front-end integrated circuit. For example, the remote head may increase output power by increasing the gain applied by one or more of its remote front-end amplifier units. On the other hand, the remote head may decrease output power by decreasing the gain applied by one or more of its remote front-end amplifier units.

In some embodiments, each amplifier unit in a radio frequency system may be dedicated to amplifying (e.g., applying gain to) analog electrical signals communicated with a specific antenna. In other words, in such embodiments, a remote-front end integrated circuit coupled to multiple antennas may include multiple amplifier units. For example, the remote front-end integrated circuit may include a first remote front-end amplifier unit dedicated to amplifying analog electrical signals communicated with a first antenna and a second remote front-end amplifier unit dedicated to amplifying analog electrical signals communicated with a second antenna.

Additionally, in some embodiments, each amplifier unit in a radio frequency system may be dedicated to amplifying analog electrical signals communicated via a specific data stream. As described above, in some embodiments, a radio frequency system may be implemented to enable concurrently (e.g., substantially simultaneously) communicating multiple data streams via an antenna, for example, by communicating a first data stream via horizontal polarization and a second data stream via vertical polarization. In other words, when implemented to enable concurrent communication of multiple data streams via an antenna, a remote-front end integrated circuit in a remote head may include a set of multiple remote front-end amplifier units each dedicated to amplifying an analog electrical signal communicated with the antenna. Moreover, when implemented to enable concurrent communication of multiple data streams via multiple antennas, a remote-front end integrated circuit in a remote head may include multiple sets of remote front-end amplifier units each dedicated to amplifying analog electrical signals communicated with a corresponding antenna.

To help illustrate, continuing with the above example, the first remote front-end amplifier unit and the second remote front-end amplifier unit may each be dedicated to amplifying analog electrical signals in a first data stream. To enable concurrently communicating a second data stream via the first antenna, a first set of remote-front end amplifier units in the remote-front end integrated circuit may include the first remote front-end amplifier unit and a third remote front-end amplifier unit dedicated to amplifying analog electrical signals in the second data stream communicated with the first antenna. Additionally or alternatively, to enable concurrently communicating the second data stream via the second antenna, a second set of remote-front end amplifier units in the remote-front end integrated circuit may include the second remote front-end amplifier unit and a fourth remote front-end amplifier unit dedicated to amplifying analog electrical signals in the second data stream communicated with the second antenna.

Furthermore, in some embodiments, each amplifier unit in a radio frequency system may be dedicated to amplifying a specific frequency component (e.g., band, spectrum, or range) of analog electrical signals. In other words, when implemented to enable concurrent communication of multiple frequency bands via an antenna, a remote-front end integrated circuit in a remote head may include a set of multiple remote front-end amplifier units each dedicated to amplifying an analog electrical signal communicated with the antenna. Moreover, when implemented to enable concurrent communication of frequency bands via multiple antennas, a remote-front end integrated circuit in a remote head may include multiple sets of remote front-end amplifier units each dedicated to amplifying an analog electrical signal communicated with a corresponding antenna.

To help illustrate, continuing with the above example, the first remote front-end amplifier unit and the third remote front-end amplifier unit included in the first set of remote front-end amplifier units may each be dedicated to amplifying analog electrical signals in a first (e.g., 28 GHz or 24.25-29.5 GHz) frequency band. To enable concurrently communicating the first frequency band and a second (e.g., 39 GHz, 37-43.5 GHz, 60 GHz, or 54-71 GHz) frequency band via the first antenna, the first set of remote-front end amplifier units may additionally include a fifth remote front-end amplifier unit dedicated to amplifying analog electrical signals in the second frequency band of the first data stream and a sixth remote front-end amplifier unit dedicated to amplifying analog electrical signals in the second frequency band of the second data stream. Additionally or alternatively, to enable concurrently communicating the first frequency band and the second frequency band via the second antenna, the second set of remote-front end amplifier units may additionally include a seventh remote front-end amplifier unit dedicated to amplifying analog electrical signals in the second frequency band of the first data stream and an eighth remote front-end amplifier unit dedicated to amplifying analog electrical signals in the second frequency band of the second data stream.

In addition to remote front-end amplifier units, to facilitate controlling output power, in some embodiments, a remote front-end integrated circuit may include one or more sensors, such as a temperature sensor and/or a power (e.g., voltage or current) sensor (e.g., detector), and routing circuitry, such as bi-directional coupler circuitry. For example, first bi-directional coupler circuitry may be implemented such that a first input terminal is connected to the output of a first transmit amplifier in the first remote front-end amplifier unit, a first output terminal is connected to the output of the first remote front-end amplifier unit, a first coupled terminal is connected to a first power sensor (e.g., detector), and a first isolated terminal is selectively connected to the second remote front-end amplifier unit. Additionally or alternative, second bi-directional coupler circuitry may be implemented such that a second input terminal is connected to the output of the second transmit amplifier in the second remote front-end amplifier unit, a second output terminal is connected to the output of the second remote front-end amplifier unit, a second coupled terminal is connected to a second power sensor, and a second isolated terminal is selectively connected to the first remote front-end amplifier unit.

As described above, to implement a remote head, a remote front-end integrated circuit and/or other integrated circuit devices, such as an antenna integrated circuit, may be coupled to a corresponding antenna circuit board on which one or more antennas are implemented. In this manner, a remote front-end integrated circuit and/or an antenna integrated circuit may be communicatively coupled to the one or more antennas and, thus, operate to amplify analog electrical signals communicated with the one or more antennas. For example, while a radio frequency system is operating in the reception mode, the remote front-end integrated circuit may amplify an analog electrical signal received from the one or more antennas and output the amplified analog electrical signal to the antenna integrated circuit. On the other hand, while the radio frequency system is operating in the transmission mode, the remote front-end integrated circuit may amplify an analog electrical signal received from the antenna integrated circuit and output the amplified analog electrical signal to the one or more antennas.

However, at least in some instances, different electronic devices and/or different radio frequency systems may employ different antenna configurations, for example, due to size and/or form factor constraints. As an illustrative example, a larger electronic device may have more available space within its housing and, thus, may include more antennas compared to a smaller electronic device, for example, to facilitate improving cellular coverage and/or communication reliability. In fact, in some embodiments, remote heads in the same electronic device may employ different antenna configurations. For example, the first remote head may include four antennas while the third remote head includes two antennas. Furthermore, in some embodiments, a radio frequency system may include one or more standalone (e.g., external) antennas, for example, coupled to a remote head that includes its own (e.g., internal) one or more antennas.

To facilitate improving deployment flexibility, in some embodiments, one or more integrated circuit devices to be coupled to an antenna circuit board may be implemented in a system-in-package (SiP), which supports multiple different antenna configurations. In some embodiments, a system-in-package may include a SiP circuit board, such as a printed circuit board (PCB), with pins (e.g., terminals) formed on a first (e.g., bottom) surface of the SiP circuit board. Additionally, the system-in-package may include one or more integrated circuit devices, such as an antenna integrated circuit and/or a remote front-end integrated circuit, coupled to a second (e.g., top) surface of the SiP circuit board. In other words, the antenna integrated circuit and/or the remote front-end integrated circuit may be communicatively coupled to the pins via conductive traces and/or vias formed in the SiP circuit board.

To enable communication with its antennas formed on a first (e.g., bottom) surface, an antenna circuit board may include pads (e.g., terminals) formed on a second (e.g., top) surface to interface with the pins formed on the SiP circuit board. As such, by coupling the system-in-package to the antenna circuit board, the pins on the SiP circuit board and, thus, an antenna integrated circuit and/or a remote front-end integrated circuit coupled to the SiP circuit board may be communicatively coupled to the antennas via conductive traces and/or vias formed in the antenna circuit board. In other words, in some embodiments, a system-in-package may support multiple different antenna configurations merely by adjusting routing circuitry in an antenna circuit board coupled thereto.

To help illustrate, a remote head may include an antenna integrated circuit and multiple (e.g., two, three, or more) antennas. In some embodiments, the antennas may be directly coupled to the antenna integrated circuit. Accordingly, in such embodiments, the antenna integrated circuit may be implemented and/or operated to amplify analog electrical signals communicated with each of the multiple antennas. However, as described above, due at least in part to the semiconductor manufacturing technique used to implement an antenna integrated circuit, in some embodiments, gain (e.g., amplification) applied by the antenna integrated circuit and, thus, resulting output power may be limited.

To facilitate leveraging tradeoffs between different semiconductor manufacturing techniques, in some embodiments, the remote head may include a (e.g., first) remote front-end integrated circuit coupled between its antenna integrated circuit and one or more (e.g., a first subset) of its antennas. For example, in some embodiments, the remote head may include two antennas coupled to the remote front-end integrated circuit. Accordingly, in such embodiments, the remote front-end integrated circuit may be implemented and/or operated to amplify analog electrical signals communicated with each of the two antennas.

To facilitate increasing the number of antennas, in some embodiments, a remote head may be implemented with multiple remote front-end integrated circuits. In other words, in such embodiments, the remote head may additionally include a second remote front-end integrated circuit coupled between its antenna integrated circuit and a second subset of its antennas. For example, the remote head may include another two antennas coupled to the second remote front-end integrated circuit and, thus, the second remote front-end integrated circuit may be implemented and/or operated to amplify analog electrical signals communicated with each of the other two antennas. In fact, in some embodiments, a system-in-package including an antenna integrated circuit and a single remote front-end integrated circuit may be used to implement a remote head with multiple remote front-end integrated circuits, for example, by coupling the system-in-package along with one or more additional remote front-end integrated circuits to an antenna board of the remote head.

Furthermore, in some embodiments, a remote head may be implemented and/or operated to amplify analog electrical signals communicated with an antenna on a different remote head. For example, a first remote head may be coupled to a second remote head via one or more electrical connectors. In some embodiments, the first remote head may include a first terminal, a first antenna integrated circuit, a first remote front-end integrated circuit, a second remote front-end integrated circuit, two antennas coupled to the first remote front-end integrated circuit, and another two antennas coupled to the second remote frontend integrated circuit. In other words, in such embodiments, the first remote front-end integrated circuit may be implemented and/or operated to amplify analog electrical signals communicated with two of the antennas while the second remote front-end integrated circuit may be implemented and/or operated to amplify analog electrical signals communicated with the other two antennas.

On the other hand, in some embodiments, the second remote head may include a second antenna integrated circuit, a third remote front-end integrated circuit, two antennas coupled to the third remote front-end integrated circuit, and a second terminal, which may be coupled to the first terminal of the first remote head. In other words, in such embodiments, the third remote front-end integrated circuit may be implemented and/or operated to amplify analog electrical signals communicated with the two antenna on the second remote head. Additionally, in some embodiments, the first terminal on the first remote head and the second terminal on the second remote head may be communicatively coupled via one or more electrical connectors (e.g., flex cables). As such, in some embodiments, analog electrical signals communicated with the two of the antennas on the second remote head may be routed through the first remote head.

Moreover, in some embodiments, different remote heads may be operated to produce differing output powers, for example, to facilitate overcoming differing propogation losses experienced by the remote heads and/or due to the remote heads including differing number of antennas. For example, a first remote head may include a first terminal, a first antenna integrated circuit, and four antennas directly coupled to the first antenna integrated circuit. On the other hand, a second remote head coupled to the first remote head may include a second antenna integrated circuit, a remote front-end integrated circuit, two antennas coupled to the remote front-end integrated circuit, and a second terminal, which may be coupled to the first terminal of the first remote head.

In other words, in some embodiments, the remote front-end integrated circuit of the second remote head may implemented and/or operated to amplify analog electrical signals communicated with the two antennas on the second remote head. On the other hand, the analog electrical signals communicated with the four antennas on the first remote head may be amplified via the first antenna integrated circuit. Due at least in part to tradeoffs resulting from differing semiconductor manufacturing techniques, in some embodiments, the second remote head may be implemented and/or operated to produce higher output powers compared to the first remote head.

As described above, in some embodiments, the first terminal on the first remote head and the second terminal on the second remote head may be communicatively coupled via one or more electrical connectors and, thus, analog electrical signals communicated with the antennas on the second remote head may be routed through the first remote head. In particular, in some embodiments, the analog electrical signals communicated with the antennas on the second remote head may be routed through the first antenna integrated circuit on the first remote head, which, at least in some instances, may obviate the second integrated circuit on the second remote head. In other words, in such embodiments, the second remote head may be implemented without the second antenna integrated circuit, which, at least in some instances may facilitate reducing implementation associated cost, such as physical footprint and/or component count.

Moreover, in some embodiments, a remote head may be implemented to amplify analog electrical signals communicated with one or more standalone (e.g., external) antennas. For example, a remote head may be connected to two standalone antennas. In some embodiments, the remote head may include a terminal, an antenna integrated circuit, four antennas coupled to the antenna integrated circuit, and a remote front-end integrated circuit coupled between the antenna integrated circuit and the terminal.

Additionally, in some embodiments, the terminal on the remote head may be communicatively coupled to the standalone antennas via one or more electrical connectors (e.g., flex cables). In other words, in some embodiments, analog electrical signals communicated with the standalone antennas may be routed through the remote head. In particular, in such embodiments, the remote front-end integrated circuit in the remote head may be implemented and/or operated to amplify analog electrical signals communicated with the standalone antennas. On the other hand, the analog electrical signal communicated with the four antennas on the remote head may be amplified via the antenna integrated circuit. Due at least in part to tradeoffs resulting from different semiconductor manufacturing techniques, in some embodiments, the remote head may be implemented and/or operated to produce higher output powers from the standalone antennas compared to its own antennas.

As illustrated by the above examples, different antenna configurations may utilize remote heads with common circuitry features. To facilitate improving deployment flexibility, in some embodiments, one or more of the common circuitry features may be implemented in a system-in-package. For example, a remote head system-in-package may include an antenna integrated circuit to be included in a remote head. Additionally or alternatively, a remote head system-in-package may include an antenna integrated circuit and a remote front-end integrated circuit. Furthermore, in some embodiments, a remote head system-in-package may include an antenna integrated circuit and two remote front-end integrated circuits. In this manner, the same system-in-package design may be used to implement remote heads deployed in different antenna configurations. In other words, in some embodiments, different remote heads may each include an instance of a remote head system-in-package implemented using a common (e.g., the same) system-in-package design.

In addition to improving implementation flexibility, in some embodiments, implementing an antenna integrated circuit and/or a remote front-end integrated circuit in a system-in-package may facilitate reducing implementation associated cost, for example, by enabling a reduction in physical footprint (e.g., size). In particular, in some embodiments, a system-in-package may include its own electromagnetic shielding (e.g., electromagnetic shield can) to block electromagnetic interference from reaching electrical conductive material implemented therein. At least in some instances, implementing the system-in-package with its own electromagnetic shielding may obviate implementing additional and/or separate electromagnetic shielding around the antenna circuit board and/or the remote head as a whole.

In this manner, the techniques described in the present disclosure may facilitate improving implementation flexibility and/or implementation associated cost of radio frequency systems, for example, via a remote head system-in-package that includes circuitry features common between different antenna configurations, thereby enabling the same system-in-package design to be used to implement remote heads in the different antenna configurations. Moreover, the techniques described in the present disclosure may facilitate improving communication reliability and/or operational efficiency of radio frequency systems, for example, by enabling antennas to be positioned at disparate locations in an electronic device and/or enabling output power of an antenna to be controlled closer to the antenna. In other words, as will be described in more detail below, the techniques described in the present disclosure may facilitate improving implementation flexibility, implementation associated cost, communication reliability, and/or operational efficiency of radio frequency systems and, thus, electronic devices in which the radio frequency systems are deployed.

To help illustrate, an example of an electronic device 10, which includes a radio frequency system 12, is shown in FIG. 1. As will be described in more detail below, the electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

As depicted, in addition to the radio frequency system 12, the electronic device 10 includes one or more input devices 14, one or more input/output ports 16, a processor core complex 18, one or more storage devices 20, a power source 22, memory 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 24 and a storage device 20 may be included in a single memory or storage component.

As depicted, the processor core complex 18 is operably coupled with memory 24 and the storage device 20. In this manner, the processor core complex 18 may execute instruction stored in memory 24 and/or the storage device 20 to perform operations, such as instructing the radio frequency system 12 to communicate with another electronic device 10 and/or a communication network. As such, the processor core complex 18 may include one or more general purpose microprocessors, one or more application specific processors (ASICs), one or more field programmable logic arrays (FPGAs), or any combination thereof.

In addition to instructions, the memory 24 and/or the storage device 20 may store data to be processed by the processor core complex 18. Thus, in some embodiments, the memory and/or the storage device 20 may include one or more tangible, non-transitory, computer-readable mediums. For example, the memory 24 may include random access memory (RAM) and the storage device 20 may include read only memory (ROM), rewritable non-volatile memory, such as flash memory, a hard drive, an optical disc, and/or the like.

As depicted, the processor core complex 18 is also operably coupled with the I/O ports 16. In some embodiments, the I/O ports 16 may enable the electronic device 10 to interface with other electronic devices 10. For example, a portable storage device may be connected to an I/O port 16, thereby enabling the processor core complex 18 to communicate with the portable storage device.

Additionally, as depicted, the processor core complex 18 is operably coupled to the power source 22. In this manner, the power source 22 may provide electrical power to the processor core complex 18, for example, as well as one or more other components in the electronic device 10, such as the radio frequency system 12. Thus, the power source 22 may include any suitable energy source, such as a rechargeable lithium polymer (Li-poly) battery and/or an alternating current (AC) power converter.

Furthermore, as depicted, the processor core complex 18 is operably coupled with the input devices 14. In some embodiments, an input device 14 may facilitate user interaction with the electronic device 10, for example, by receiving user inputs and communicating the user inputs to the processor core complex 18. Thus, in some embodiments, the input devices 14 may include a button, a keyboard, a mouse, a trackpad, and/or the like. Additionally, in some embodiments, the input devices 14 may include touch sensing components implemented in the electronic display 26. In such embodiments, the touch sensing components may receive user inputs by detecting occurrence and/or position of an object contacting the surface of the electronic display 26.

In addition to enabling user inputs, the electronic display 26 may display images, such as a graphical user interface (GUI) for an operating system, an application interface, a still image, or video content. As depicted, the electronic display 26 is operably coupled to the processor core complex 18. As such, in some embodiments, the electronic display 26 may display images based at least in part on image data received from the processor core complex 18.

As depicted, the processor core complex 18 is also operably coupled with the radio frequency system 12. As described above, the radio frequency system 12 may facilitate wirelessly communication with another electronic device 10 and/or a communication network. For example, the radio frequency system 12 may enable the electronic device 10 to communicate with a personal area network (PAN), such as a Bluetooth network, a local area network (LAN), such as an 802.11x Wi-Fi network, and/or a wide area network (WAN), such as an LTE or a millimeter wave (mmWave) cellular network. In other words, the radio frequency system 12 may enable wirelessly communicating data using various communication protocols.

Even when using different communication protocols and/or different communication frequencies, operational principles of radio frequency systems 12 may generally be similar. For example, the radio frequency system 12 may convert a digital electrical signal, which digitally represents a (e.g., data) packet to be wirelessly transmitted, into an analog electrical signal, thereby generating an analog representation of the packet. Additionally, the radio frequency system 12 may amplify the analog electrical signal to a target output (e.g., transmission) power, thereby generating an amplified analog electrical signal, for example, after converting the analog electrical signal from a processing (e.g., intermediate or baseband) frequency to a target communication (e.g., transmission and/or reception) frequency. Based at least in part on the amplified analog electrical signal, the radio frequency system 12 may modulate electromagnetic waves at a radio frequency, thereby wirelessly transmitting the packet via an electromagnetic wave signal.

Additionally or alternatively, the radio frequency system 12 may generate an analog electrical signal modulated based at part on power of received (e.g., incident) electromagnetic waves, thereby indicating a wirelessly received packet via an analog electrical signal. Since received electromagnetic waves often include electromagnetic interference, the radio frequency system 12 may filter and/or amplify the analog electrical radio frequency signals. Furthermore, to facilitate subsequent processing, the radio frequency system 12 may convert the analog electrical signal from the communication (e.g., transmission and/or reception) frequency to a processing (e.g., intermediate or baseband) frequency and/or to a digital electrical signal. Due to similarities in operational principles, the techniques described herein may be applicable to any suitable radio frequency system 12 regardless of communication protocol or communication frequency.

Figure 2:
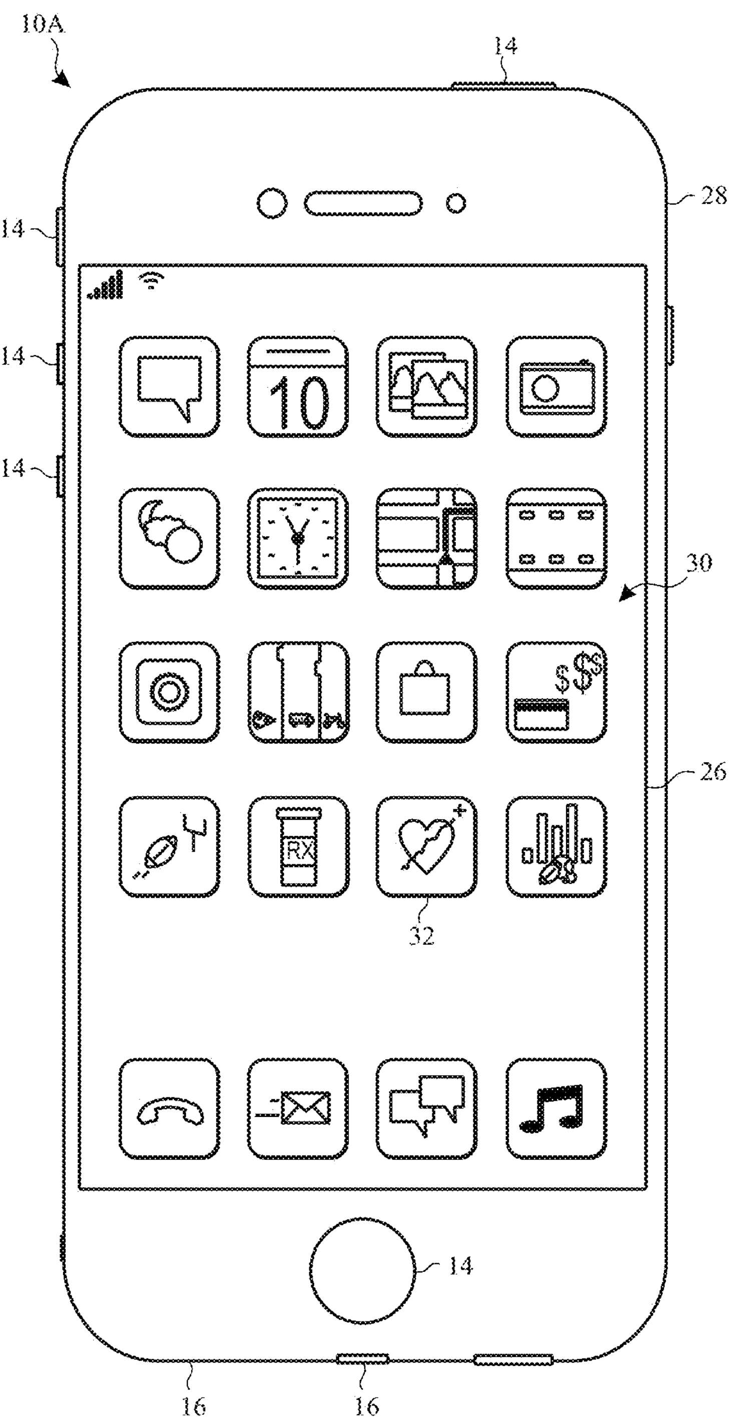
FIG. 2 is an example of the electronic device of FIG. 1, in accordance with an embodiment of the present disclosure.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 28 (e.g., housing). In some embodiments, the enclosure 28 may protect interior components from physical damage and/or shield them from electromagnetic interference. Thus, a radio frequency system 12 may also be enclosed within the enclosure 28 and internal to the handheld electronic device 10A.

Additionally, as depicted, the enclosure 28 may surround the electronic display 26. In the depicted embodiment, the electronic display 26 is displaying a graphical user interface (GUI) 29 having an array of icons 31. By way of example, when an icon is selected be a user input received via an input device 14 or a touch sensing component of the electronic display 26, an application program may launch.

Furthermore, as depicted, input devices 14 open through the enclosure 28. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
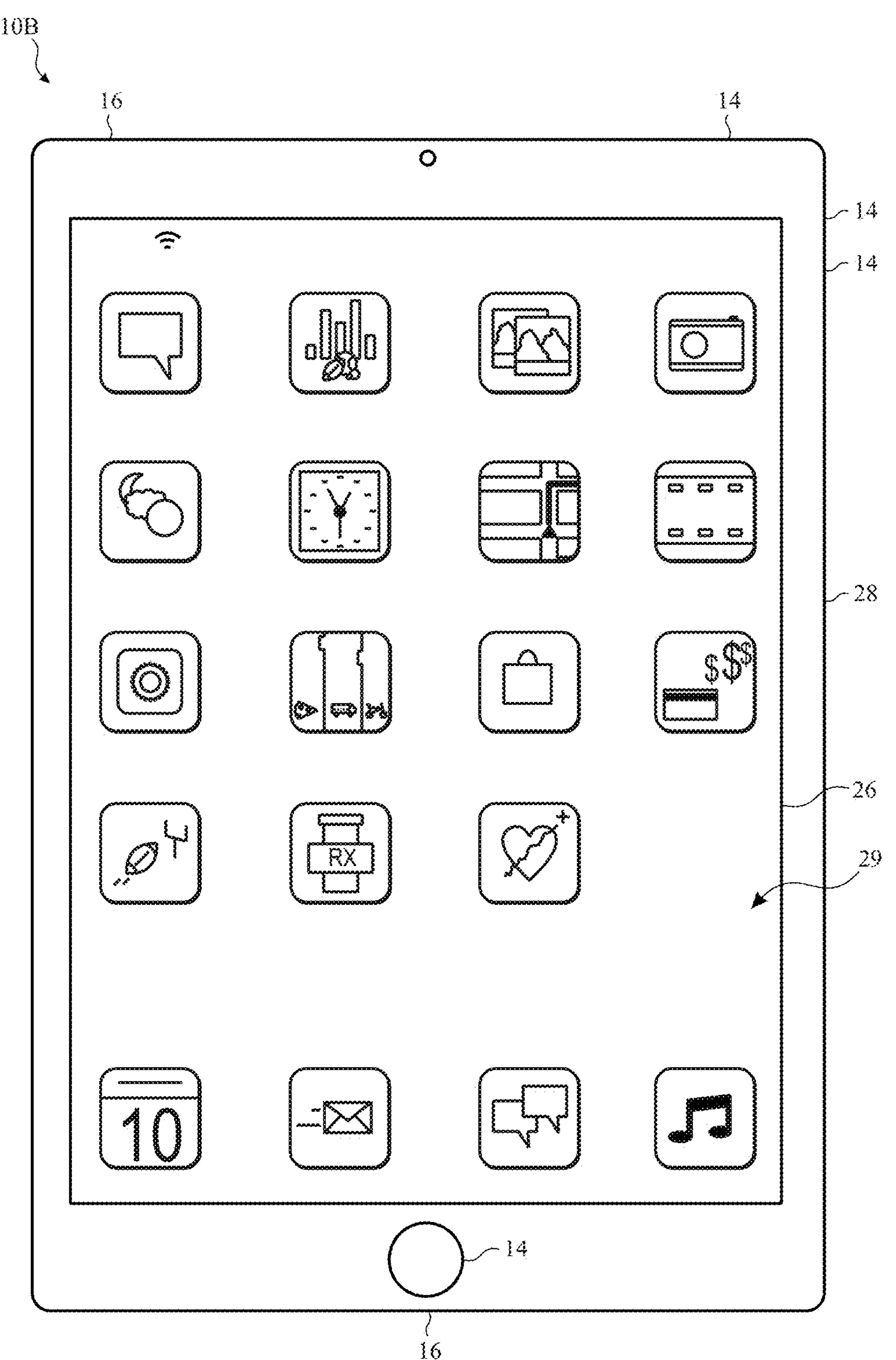
FIG. 3 is another example of the electronic device of FIG. 1, in accordance with an embodiment of the present disclosure.
Figure 4:
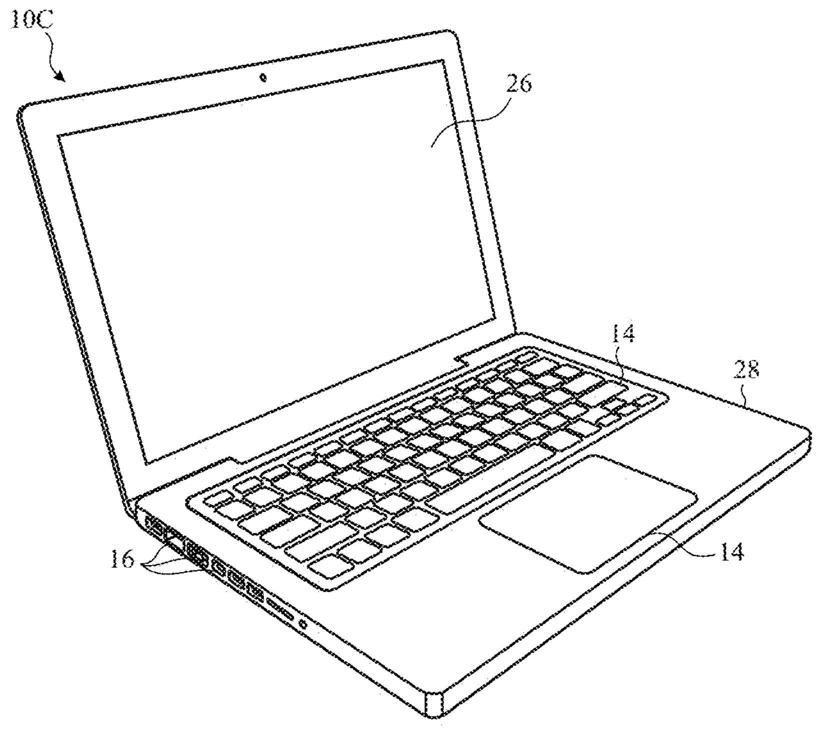
FIG. 4 is another example of the electronic device of FIG. 1, in accordance with an embodiment of the present disclosure.
Figure 5:
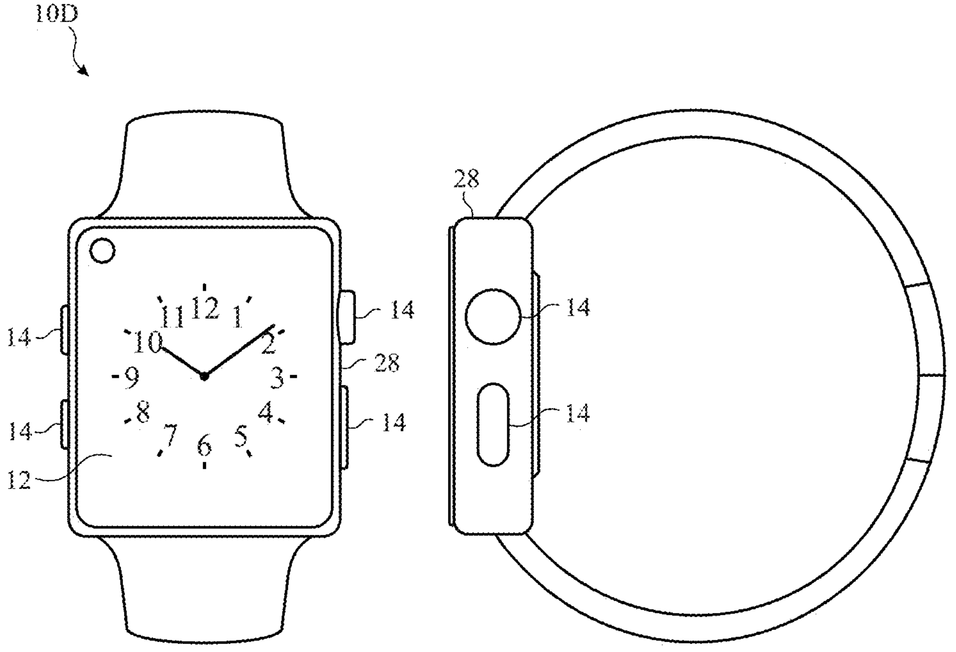
FIG. 5 is another example of the electronic device of FIG. 1, in accordance with an embodiment of the present disclosure.

To help further illustrate, another example of a suitable electronic device 10, specifically a tablet electronic device 10B is shown in FIG. 3. As an illustrative example, the tablet electronic device 10B may be any iPad® model available from Apple Inc. A further example of a suitable electronic device 10, specifically a computer 10C, is shown in FIG. 4. As an illustrative example, the computer 10C may be any MacBook® or iMac® model available from Apple Inc. Another example of a suitable electronic device 10, specifically a watch 10D, is shown in FIG. 5. As an illustrative example, the watch 10D may be any Apple Watch® model available from Apple Inc.

As depicted, the tablet electronic device 10B, the computer 10C, and the watch 10D each also include an electronic display 26, input devices 14, I/O ports 16, and an enclosure 28. Thus, in some embodiments, the enclosure 28 may enclose a radio frequency system 12 in the tablet electronic device 10B, the computer 10C, and/or the watch 10D. In any case, as described above, a radio frequency system 12 may facilitate wirelessly communication with other electronic devices 10 and/or a communication network.

Figure 6:
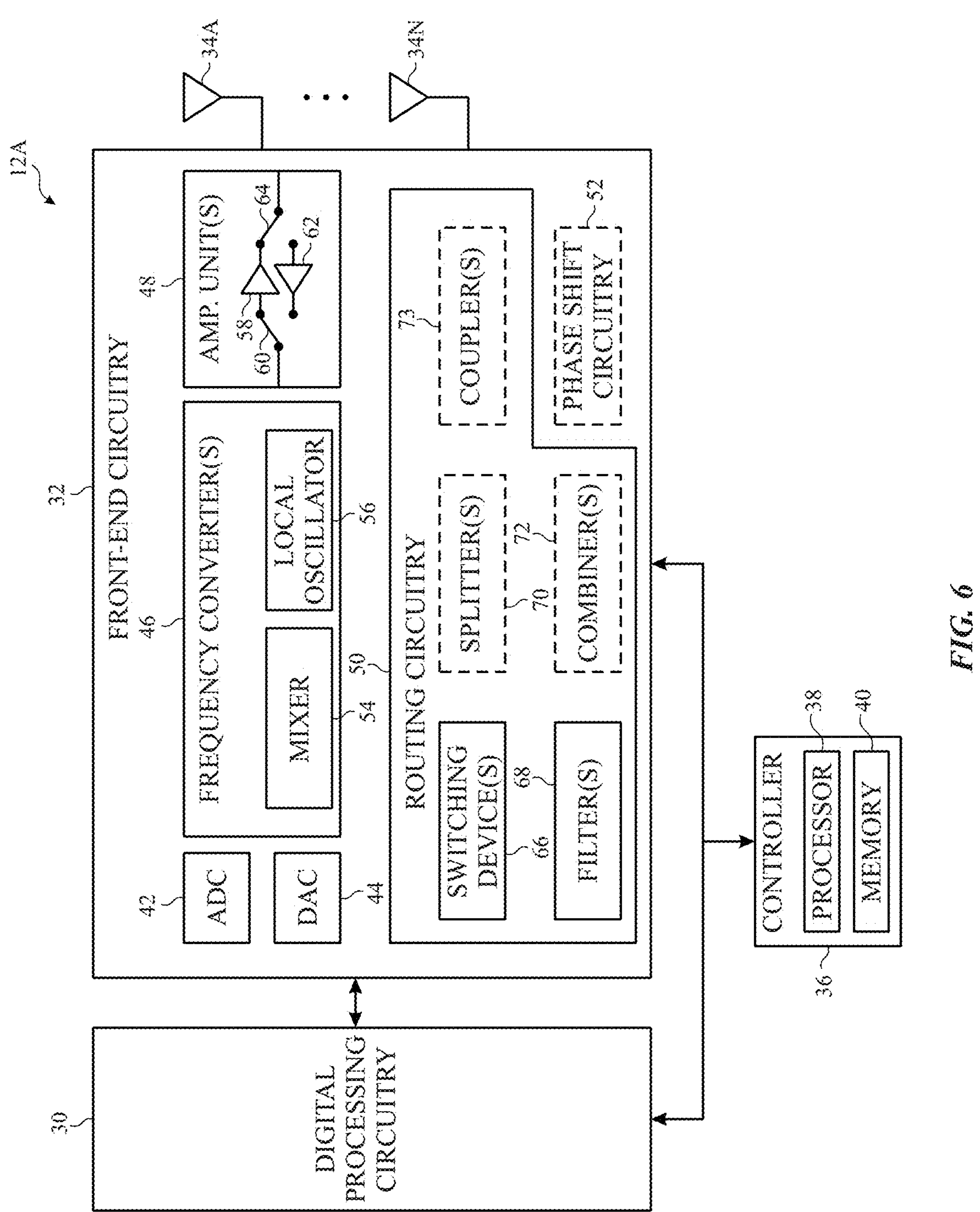
FIG. 6 is block diagram of a portion of the radio frequency system of FIG. 1 including front-end circuitry and antennas, in accordance with an embodiment of the present disclosure.

To help illustrate, an example of a radio frequency system 12, which may be implemented (e.g., deployed) in an electronic device 10, is shown in FIG. 6. As in the depicted example, a radio frequency system 12 may include digital processing circuitry 30, front-end circuitry 32, one or more antennas 34, and a controller 36 (e.g., control circuitry). In some embodiments, the controller 36 may generally control operation of the radio frequency system 12. Although depicted as a single controller 36, in other embodiments, one or more separate controllers 36 may be used to control operation of the radio frequency system 12.

To facilitate controlling operation, the controller 36 may include one or more controller processors 38 and/or controller memory 40. In some embodiments, a controller processor 38 may execute instructions and/or process data stored in the controller memory 40, for example, to determine a control command (e.g., signal) that instructs the radio frequency system 12 to perform a control action. Additionally or alternatively, a controller processor 38 may be hardwired with instructions that determine control commands when executed. Furthermore, in some embodiments, a controller processor 38 may be included in the processor core complex 18, separate processing circuitry, or both and the controller memory 40 may be included in memory 24, a storage device 20, another tangible, non-transitory computer-readable medium, or any combination thereof.

Generally, digital processing circuitry 30 implemented in a radio frequency system 12 operates in a digital domain. In other words, the digital processing circuitry 30 may process data indicated via digital electrical signals, for example, which indicate "0" bits when voltage is below a voltage threshold and "1" bits when voltage is above the voltage threshold. Thus, in some embodiments, the digital processing circuitry 30 may include a modem, a baseband processor, and/or the like. Additionally, in some embodiments, the digital processing circuitry 30 may be communicatively coupled to the processor core complex 18 to enable the electronic device 10 to wirelessly transmit data and/or receive wirelessly transmitted data via the radio frequency system 12.

On the other hand, antennas 34 implemented in a radio frequency system 12 generally operate in an analog domain. For example, an antenna 34 may facilitate wireless transmission by modulating electromagnetic (e.g., radio) waves based at least in part on an analog electrical signal received from the front-end circuitry 32. Additionally or alternatively, an antenna 34 may facilitate reception of a wireless transmission by outputting an analog electrical signal based at least in part on received (e.g., incident) electromagnetic waves.

As described above, in some embodiments, a radio frequency system 12 may include multiple antennas 34, for example, to facilitate improving operational flexibility, communication bandwidth, transmission distance, and/or communication reliability of the radio frequency system 12. As an illustrative example, a first antenna 34A may be implemented to communicate with a first (e.g., LTE) communication network while an Nth antenna 34N is implemented to communicate with a second (e.g., mmWave or different) communication network, thereby improving operational flexibility and/or communication bandwidth, for example, by enabling the radio frequency system 12 to selectively and/or concurrently (e.g., simultaneously) communicate with multiple different communication networks. Additionally or alternatively, the first antenna 34A may be implemented to communicate a first (e.g., horizontally polarized) data stream while an Nth antenna 34N is implemented to communicate a second (e.g., vertically polarized) data stream, thereby improving communication bandwidth, for example, by enabling the radio frequency system 12 to concurrently communicate multiple different data streams.

Furthermore, in some embodiments, the first antenna 34A and the Nth antenna 34N may be included in an antenna array, for example, to enable beam forming techniques, which, at least in some instances, may facilitate improving transmission distance and, thus, communication reliability of radio frequency system 12. However, it should be appreciated that the depicted example is merely intended to be illustrative and not limiting. For example, in other embodiments, a radio frequency system 12 may be implemented with a single antenna 34 or more than two antennas 34.

As in the depicted example, the front-end circuitry 32 may be coupled between the digital processing circuitry 30 and the antennas 34 and, thus, operate as an interface between the digital domain and the analog domain. For example, the front-end circuitry 32 may include an analog-to-digital converter (ADC) 42 implemented and/or operated to convert an analog electrical signal (e.g., output from an antenna 34) into a digital electrical signal (e.g., to be output to the digital processing circuitry 30). Additionally, as in the depicted example, the front-end circuitry 32 may include a digital-to-analog converter (DAC) 44 implemented and/or operated to convert a digital electrical signal (e.g., output from the digital processing circuitry 30) into an analog electrical signal (e.g., to be output to an antenna 34).

In addition to the analog-to-digital converter 42 and the digital-to-analog converter 44, as in the depicted example, the front-end circuitry 32 may include one or more frequency converters 46, one or more amplifier (e.g., buffer) units 48 (e.g., assemblies or devices), and routing circuitry 50. In some embodiments, the radio frequency system 12 may also include phase shift circuitry 52, for example, to facilitate implementing beam forming techniques. In other words, in other embodiments, the phase shift circuitry 52 may be obviated (e.g., optional), for example, when the radio frequency system 12 does not implement beam forming techniques.

Generally, a frequency converter 46 implemented in front-end circuitry 32 of a radio frequency system 12 operates to convert an analog electrical signal from a first frequency to a second (e.g., different) frequency. For example, a frequency converter 46 may be implemented and/or operated to convert between a processing (e.g., baseband) frequency used by the digital processing circuitry 30 and a communication (e.g., carrier) frequency used by an antenna 34. Additionally or alternatively, a first frequency converter 46 may be implemented and/or operated to convert between the processing frequency and an intermediate frequency, which is between the processing frequency and the communication frequency, while a second frequency converter 46 is implemented and/or operated to convert between the intermediate frequency and the communication frequency.

To facilitate converting frequency, as in the depicted example, a frequency converter 46 may include a mixer 54 and a local oscillator 56. In some embodiments, the local oscillator 56 may generate a local oscillator signal, for example, with a frequency that matches a target frequency to which an analog electrical signal is to be converted. Based at least in part on the local oscillator signal, the mixer 54 may up convert or down convert frequency of an analog electrical signal, for example, by modulating the local oscillator signal based on the analog electrical signal.

Additionally, an amplifier unit 48 implemented in front-end circuitry 32 of a radio frequency system 12 generally operates to amplify magnitude (e.g., amplitude) of an analog electrical signal, for example, to facilitate overcoming communication (e.g., propogation and/or connector) losses. Thus, as in the depicted example, an amplifier unit 48 may include a transmit (e.g., power) amplifier 58 and a receipt (e.g., low noise) amplifier 62 each selectively connectable via a first amplifier switching device 60 and/or a second amplifier switching device 64. In some embodiments, the first amplifier switching device 60 and/or the second amplifier switching device 64 may be a semiconductor switching device, such as a metal-oxide-semiconductor field-effect transistor (MOSFET).

However, it should again be appreciated that the depicted example is merely intended to be illustrative and not limiting. For example, in some embodiments, front-end circuitry 32 may include one or more transmit amplifier units 48, which each includes a selectively connectable transmit amplifier 58, but not a receipt amplifier 62. Additionally or alternatively, front-end circuitry 32 may include one or more receipt amplifier units 48, which each includes a selectively connectable receipt amplifier 62, but not a transmit amplifier 58. Furthermore, in some embodiments, an amplifier unit 48 may include a selectively connectable bypass path, which bypasses its transmit amplifier 58 and/or its receipt amplifier 62 when connected.

Moreover, routing circuitry 50 implemented in front-end circuitry 32 of a radio frequency system 12 generally operates to route analog electrical signals to appropriate destinations in the radio frequency system 12. To facilitate routing, as in the depicted example, the routing circuitry 50 may include one or more routing switching devices 66 and/or one or more filters 68 (e.g., filter circuitry). In some embodiments, one or more of the routing switching devices 66 may be implemented in a multiplexer or a de-multiplexer. Additionally, in some embodiments, the routing switching devices 66 may include a time division duplex (TDD) switch or a frequency division duplex (FDD) switch, for example, which selectively switches between a first state corresponding with the transmission (e.g., uplink) mode and a second state corresponding with the reception (e.g., downlink) mode. Furthermore, in some embodiments, one or more of the routing switching devices 66 may be a semiconductor switching device, such as a metal-oxide-semiconductor field-effect transistor (MOSFET).

In some embodiments, a filter 68 (e.g., filter circuitry) may be implemented and/or operated to remove noise from an analog electrical signal, for example, by attenuating frequencies outside a target communication frequency (e.g., band, range or spectrum). Thus, in some embodiments, the filters 68 may include one or more bandpass filters. Additionally or alternatively, a filter 68 may implemented and/or operated to facilitate separating an analog electrical signal into multiple constituent components. For example, a filter 68 may be implemented and/or operated to facilitate identifying (e.g., separating out) multiple frequency components (e.g., bands, ranges, or ranges) in an analog electrical signal. Additionally or alternatively, a filter 68 may be implemented and/or operated to facilitate identifying multiple data streams indicated in an analog electrical signal.

As described above, in some embodiments, a radio frequency system 12 may be implemented and/or operated to concurrently communicate multiple data streams via an antenna 34. Additionally, as described above, in some embodiments, a radio frequency system 12 may be implemented and/or operated to communicate a data stream that utilizes multiple different frequency bands (e.g., ranges, spectrums, or components). To facilitate concurrently communicating multiple data streams and/or multiple different frequency bands, in some embodiments, the routing circuitry 50 may include one or more combiners 72 (e.g., combiner circuitry) that generally operate to combine analog electrical signals received from multiple different sources into a single analog electrical signal. For example, a combiner 72 (e.g., combiner circuitry) may operate to combine multiple analog electrical signals corresponding with different data streams and/or different frequency bands to be concurrently transmitted via an antenna 34 into a combined analog electrical signal, which may then be supplied to the antenna 34. In other words, in other embodiments, the one or more combiners 72 may be obviated (e.g., optional), for example, when the radio frequency system 12 is not implemented to concurrently transmit multiple data streams and/or multiple different frequency bands.

Additionally, as described above, in some embodiments, a radio frequency system 12 may be implemented and/or operated to concurrently communicate a data stream via multiple antennas 34. To facilitate concurrently communicating a data streams via multiple antennas 34, in some embodiments, the routing circuitry 50 may additionally include one or more splitters 70 (e.g., splitter circuitry) that generally operate to supply the same analog electrical signal to multiple different destinations. For example, a splitter 70 (e.g., splitter circuitry) may be implemented and/or operated to split an analog electrical signal corresponding with a data stream into a first analog electrical signal, which may be supplied to the first antenna 34A, and a second analog electrical signal, which may be supplied to the Nth antenna 34N. In other words, in other embodiments, the one or more splitters 70 may be obviated (e.g., optional), for example, when the radio frequency system 12 is not implemented to concurrently transmit a data stream via multiple antennas 34.

Furthermore, in some embodiments, the routing circuitry 50 may include one or more couplers 73. For example, the routing circuitry 50 may include one or more bi-directional couplers 73. As will be described in more detail below, in some embodiments, a coupler 73 may be coupled between an amplifier unit 48 in the front-end circuitry 32 and a power (e.g., voltage and/or current) sensor. In such embodiments, the coupler 73 may selectively couple the output of the amplifier unit 48 to the power sensor, for example, to facilitate determining magnitude (e.g., amplitude) of an analog electrical signal output from the amplifier unit 48 and, thus, resulting output power when the analog electrical signal is supplied to an antenna 34.

As described above, in some embodiments, the front-end circuitry 32 may be implemented across multiple integrated circuit devices (e.g., chips or dies). For example, the analog-to-digital converter 42 and the digital-to-analog converter (DAC) 44 may be implemented in a transceiver integrated circuit. Additionally or alternatively, a first one or more amplifier units 48 may be implemented on a transceiver-side of the front-end circuitry 32 and a second one or more amplifier units 48 may be on an antenna-side of the front-end circuitry 32.

Figure 7:
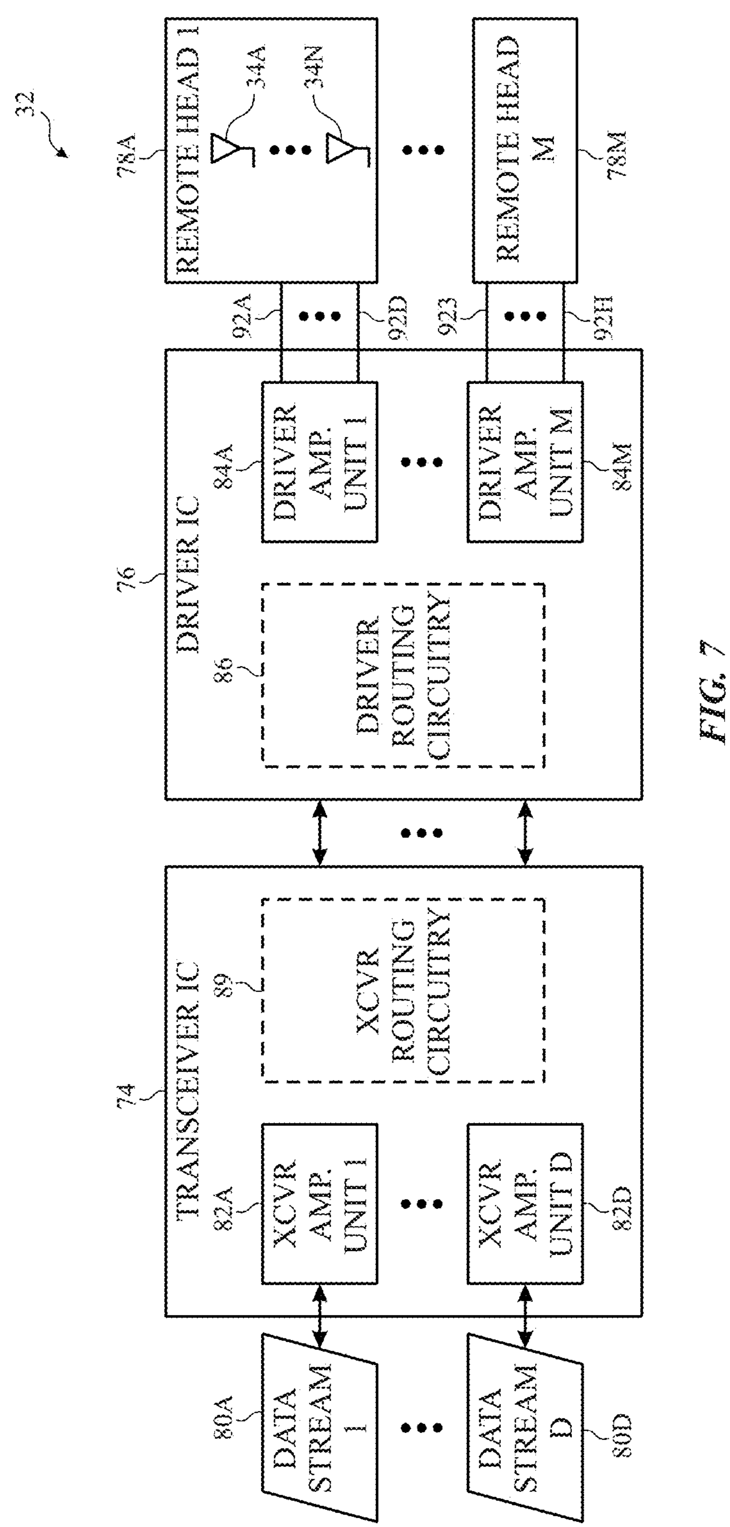
FIG. 7 is a block diagram of an example of the front-end circuitry of FIG. 6 coupled to antennas implemented in multiple remote heads, in accordance with an embodiment of the present disclosure.

To help illustrate, an example of front-end circuitry 32, which may be deployed (e.g., implemented) in a radio frequency system 12, is shown in FIG. 7. As in the depicted example, the front-end circuitry 32A may be implemented in a transceiver integrated circuit (IC) 74, a driver (e.g., buffer) integrated circuit 76 (e.g., module), and multiple remote heads 78 (e.g., modules), which include at least a first remote head 78A and an Mth remote head 78M. Additionally, as in the depicted example, the front-end circuitry 32A may be implemented to enable concurrent (e.g., simultaneous) communication of multiple data streams 80, which include at least a first data stream 80A and a Dth data stream 80D.

However, it should be appreciated that the depicted example is merely intended to be illustrative and not limiting. For example, in other embodiments, front-end circuitry 32 may be implemented and/or operated to communicate a single data stream 80 or more than two data streams 80. Additionally or alternatively, in other embodiments, the driver integrated circuit 76 may be obviated, for example, such that the transceiver integrated circuit 74 communicates directly with the remote heads 78.

To enable concurrent communication of multiple data streams 80, as in the depicted example, the transceiver integrated circuit 74 may be implemented with multiple transceiver (XCVR) amplifier (e.g., buffer or driver) units 82. In some embodiments, each transceiver amplifier unit 82 may be dedicated to amplifying analog electrical signals communicated via a corresponding data stream 80. For example, the transceiver integrated circuit 74 may include a first transceiver amplifier unit 82A implemented to amplify analog electrical signals communicated via the first data stream 80A and a Dth transceiver amplifier unit 82D implemented to amplify analog electrical signals communicated via the Dth data stream 80D.

Additionally, in some embodiments, each transceiver amplifier unit 82 may be dedicated to amplifying a corresponding frequency band (e.g., component, spectrum, or range). For example, the first transceiver amplifier unit 82A may be implemented to amplify a first (e.g., 28 GHz or 24.25-29.5 GHz) frequency band in the first data stream 80A and the Dth transceiver amplifier unit 82D may be implemented to amplify the first frequency component in the Dth data stream 80D. As described above, in some embodiments, a data stream 80 may utilize multiple different frequency bands. Thus, in some embodiments, multiple transceiver amplifier units 82 may be dedicated to amplifying analog electrical signals communicated via a single data stream 80. For example, the transceiver integrated circuit 74 may additionally include a second transceiver amplifier unit 82 implemented to amplify a second (e.g., 39 GHz, 37-43.5 GHZ, 60 GHz, or 54-71 GHz) frequency band in the first data stream 80A and a D−1th transceiver amplifier unit 82 implemented to amplify the second frequency component in the Dth data stream 80D.

To facilitate concurrently communicating with multiple remote heads 78, as in the depicted example, the driver integrated circuit 76 may include multiple intermediate (e.g., driver) amplifier units 84. In some embodiments, each intermediate amplifier unit 84 may be dedicated to amplifying analog electrical signals communicated with a corresponding remote head 78. For example, the driver integrated circuit 76 may include a first intermediate amplifier unit 84A implemented to amplify analog electrical signals communicated with the first remote head 78A and an Mth intermediate amplifier unit 84M implemented to amplify analog electrical signals communicated with the Mth remote head 78M.

Similar to the transceiver amplifier units 82, in some embodiments, each intermediate amplifier unit 84 may be dedicated to amplifying analog electrical signals communicated via a corresponding data stream 80. For example, the first intermediate amplifier unit 84A may be implemented to amplify analog electrical signals in the first data stream 80A communicated with the first remote head 78A and the Mth intermediate amplifier unit 84M may be implemented to amplify analog electrical signals in the Dth data stream 80D communicated with the Mth remote head 78M. As described above, in some embodiments, a data stream 80 may be supplied to multiple remote heads 78, for example, to facilitate improving wireless (e.g., cellular) coverage and/or implementing beam forming techniques. Thus, in some embodiments, multiple intermediate amplifier units 84 may be dedicated to amplifying analog electrical signals communicated with a single remote head 78. For example, the driver integrated circuit 76 may include a second intermediate amplifier unit 84 implemented to amplify analog electrical signals in the Dth data stream 80D communicated with the first remote head 78A and a M−1th intermediate amplifier unit 84 implemented to amplify analog electrical signals in the first data stream 80A communicated with the Mth remote head 78M.

Moreover, similar to the transceiver amplifier units 82, in some embodiments, each intermediate amplifier unit 84 may be dedicated to amplifying a corresponding frequency band (e.g., component, range, or spectrum). In other words, continuing with the above example, the first intermediate amplifier unit 84A may be implemented to amplify the first (e.g., 28 GHz or 24.25-29.5 GHz) frequency band in the first data stream 80A communicated with the first remote head 78A and the second intermediate amplifier unit 84 may be implemented to amplify the first frequency band in the Dth data stream 80D communicated with the first remote head 78A. Additionally, the Mth intermediate amplifier unit 84M may be implemented to amplify the first frequency band in the Dth data stream 80D communicated with the Mth remote head 78M and the M−1th intermediate amplifier unit 84 may be implemented to amplify the first frequency band in the first data stream 80A communicated with the Mth remote head 78M.

As described above, in some embodiments, a data stream 80 may be communicated via multiple different frequency bands (e.g., components, ranges, or spectrums). Thus, in some embodiments, multiple intermediate amplifier units 84 may be dedicated to amplifying analog electrical signals communicated via a single data stream 80. For example, the driver integrated circuit 76 may additionally include a third intermediate amplifier unit 84 implemented to amplify the second (e.g., 39 GHz, 37-43.5 GHz, 60 GHz, or 54-71 GHz) frequency band in the first data stream 80A communicated with the first remote head 78A and a fourth intermediate amplifier unit 84 implemented to amplify the second frequency band in the Dth data stream 80D communicated with the first remote head 78A. The driver integrated circuit 76 may also include a M−2th intermediate amplifier unit 84 implemented to amplify the second frequency component in the Dth data stream 80D communicated with the Mth remote head 78M and a M−3th intermediate amplifier unit 84 implemented to amplify the second frequency component in the first data stream 80A communicated with the Mth remote head 78M.

As described above, in some embodiments, routing circuitry 50 implemented in front-end circuitry 32 of a radio frequency system 12 may facilitate routing analog electrical signals to appropriate destinations. As in the depicted example, the routing circuitry 50 may be distributed across multiple integrated circuit devices. For example, in some embodiments, intermediate (e.g., driver) routing circuitry 86 may be implemented in the driver integrated circuit 76 and transceiver routing circuitry 89 may be implemented in the transceiver integrated circuit 74.

However, in other embodiments, at least a portion of transceiver routing circuitry 89 may be obviated (e.g., optional) by the intermediate routing circuitry 86, for example, due to the transceiver routing circuitry 89 combining multiple frequency bands into a single analog electrical signal and the intermediate routing circuitry 86 subsequently separating the analog electrical signal back into the frequency bands. In other words, in such embodiments, the transceiver integrated circuit 74 may be implemented without or with reduced transceiver routing circuitry 89, which, at least in some instances, may facilitate reducing implementation associated cost of the front-end circuitry 32 and, thus, a radio frequency system 12 in which the front-end circuitry 32 is implemented. As will be described in more detail below, in some embodiments, routing circuitry 50 may additionally or alternatively be implemented in a remote head 78 along with one or more antennas 34.

As described above, at least in some instances, the transceiver integrated circuit 74 and one or more remote heads 78 may be separated by some distance, for example, when multiple remote heads 78 are implemented at disparate locations in an electronic device 10. Thus, as in the depicted example, the driver integrated circuit 76 and one or more electrical connectors 92 may be coupled between the transceiver integrated circuit 74 and the remote heads 78. In particular, a first end of an electrical connector 92 may be coupled to the driver integrated circuit 76 and a second (e.g., opposite) end of the electrical connector 92 may be coupled to a remote head 78. In other words, the driver integrated circuit 76 may be coupled on a transceiver-side of the electrical connector 92 and the remote head 78 may be coupled on an antenna-side of the electrical connector 92.

In this manner, a transceiver integrated circuit 74 and a remote head 78 may communicate analog electrical signals (e.g., indicating data to be wirelessly transmitted and/or wirelessly received data) therebetween. Additionally or alternatively, in some embodiments, a direct current (DC) electrical signal, a control (e.g., digital electrical) signal, or both may be communicated via an electrical connector 92, for example, from the controller 36 to a remote head 78. Furthermore, in some embodiments, an electrical connector 92 may be formed from electrically conductive material and, thus, may include a wire, a cable, a conductive trace, and/or the like.

It should again be appreciated that the depicted example is merely intended to be illustrative and not limiting. For example, in other embodiments, a driver integrated circuit 76 may additionally or alternatively be coupled on an antenna-side of the electrical connectors 92. Additionally or alternatively, one or more electrical connectors 92 may be coupled between the transceiver integrated circuit 74 and the driver integrated circuit 76, for example, when the transceiver integrated circuit 74 and the driver integrated circuit 76 are separated by some distance in the electronic device 10.

However, as described above, electromagnetic waves incident on electrically conductive material generally induce electrical current therein. In other words, electromagnetic waves (e.g., interference) incident on an electrical connector 92 and/or electrically conductive material in an integrated circuit device (e.g., transceiver integrated circuit 74, driver integrated circuit 76, or remote head 78) of the front-end circuitry 32A may induce electrical current therein, which, at least in some instances, may introduce noise in a concurrently communicated electrical signal, for example, by distorting the electrical signal. Accordingly, in some embodiments, electromagnetic shielding may be disposed in the transceiver integrated circuit 74, the driver integrated circuit 76, and/or a remote head 78. For example, electromagnetic shielding may be implemented on a housing of the remote head 78, which is distinct from a housing of the transceiver integrated circuit 74 and/or a housing of the driver integrated circuit 76. Additionally or alternatively, electromagnetic shielding disposed around (e.g., about) one or more of the electrical connectors 92.

Moreover, as described above, an electrical connector 92 generally produces some amount of loss when an electrical signal is communicated therethrough, for example, due to its inherent impedance (e.g., resistance, capacitance, and/or inductance). Thus, in some embodiments, the driver integrated circuit 76 may be implemented in close proximity to the transceiver integrated circuit 74, for example, to obviate and/or reduce length of electrical connectors 92 coupled therebetween. At least in some instances, this may facilitate reducing loss resulting in communication between the transceiver integrated circuit 74 and the driver integrated circuit 76, for example, due to impedance and, thus, loss produced by an electrical connector 92 varying with length of the electrical connector 92.

Additionally, in some embodiments, an electrical connector 92 may be dedicated to communicating a specific data stream 80 with a specific remote head 78. For example, a first electrical connector 92A coupled between the driver integrated circuit 76 and the first remote head 78A may be implemented to communicate the first data stream 80A while a Dth electrical connector 92D coupled between the driver integrated circuit 76 and the first antenna integrated circuit may be implemented to communicate the Dth data stream 80D. Additionally, a D+1th electrical connector 92E coupled between the driver integrated circuit 76 and the Mth remote head 78M may be implemented to communicate the first data stream 80A while a 2Dth electrical connector 92H coupled between the driver integrated circuit 76 and the Mth remote head 78M may be implemented to communicate the Dth data stream 80D.

As described above, in some embodiments, a radio frequency system 12 may be implemented to enable concurrently (e.g., simultaneously) communicating multiple (e.g., two or more) data streams 80. To facilitate streamlining discussion, examples of the techniques are described with regard to embodiments implemented to concurrently communicate two data streams 80. However, it should be appreciated that the techniques described in the present disclosure may be applied to radio frequency systems 12 implemented to communicate a single data stream 80 or more than two data streams 80.

Figure 8:
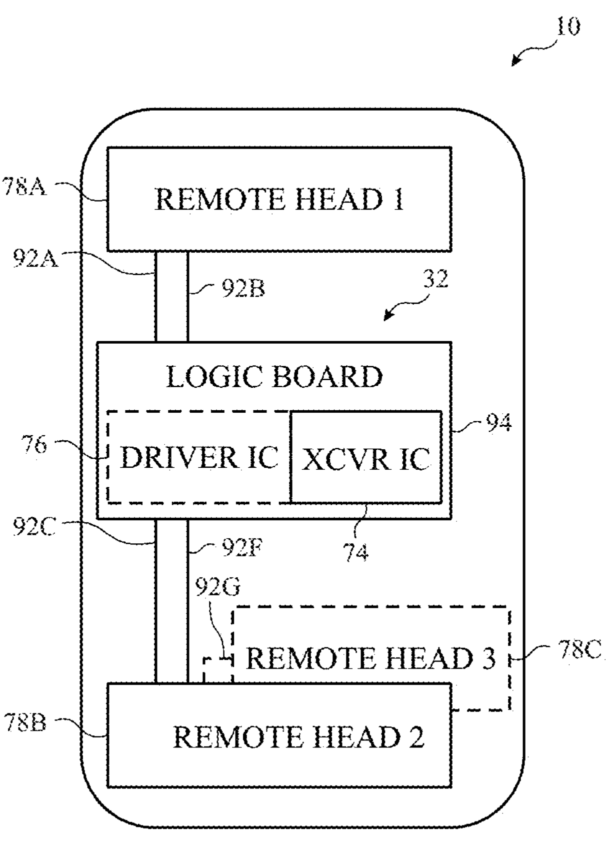
FIG. 8 is a diagrammatic representation of multiple remote heads implemented in an electronic device, in accordance with an embodiment of the present disclosure.

An example of front-end circuitry 32 implemented in an electronic device 10 to enable concurrently communicating two data streams 80—namely a first data stream 80A and a second data stream 80—via multiple remote heads 78 is shown in FIG. 8. As depicted, the remote heads 78 implemented in the front-end circuitry 32 include a first remote head 78A and a second remote head 78B. To facilitate improving wireless coverage, as in the depicted example, the first remote head 78A may be positioned along a first (e.g., top) end of the electronic device 10 while the second remote head 78B is position along a second (e.g., opposite or bottom) end of the electronic device 10.

Additionally, as depicted, the front-end circuitry 32 includes a transceiver integrated circuit 74 implemented on a (e.g., main) logic board 94. In some embodiments, the logic board 94 may additionally include a driver integrated circuit 76. However, as described above, in other embodiments, the driver integrated circuit 76 may be obviated (e.g., optional) and, thus, not included on the logic board 94.

To facilitate communicating two data streams 80 via the first remote head 78A, as in the depicted example, the logic board 94 may be coupled to the first remote head 78A via two electrical connectors 92—namely a first electrical connector 92A and a second electrical connector 92B. In some embodiments, the first electrical connector 92A may be implemented to communicate the first data stream 80A while the second electrical connector 92B may be implemented to communicate the second data stream 80. Additionally, to facilitate communicating two data streams 80 via the second remote head 78B, as in the depicted example, the logic board 94 may be coupled to the second remote head 78B via two electrical connectors—namely a third electrical connector 92C and a fourth electrical connector 92F. In some embodiments, the third electrical connector 92C may be implemented to communicate the first data stream 80A while the fourth electrical connector 92F may be implemented to communicate the second data stream 80.

Since connector loss generally varies with length of an electrical connector 92, as in the depicted example, the logic board 94 may be implemented at a more central location in the electronic device 10. For example, the logic board 94 may be positioned such that length of the first electrical connector 92A and length of the third electrical connector 92C are substantially (e.g., approximately) the same and/or length of the second electrical connector 92B and length of the fourth electrical connector 92F are substantially the same. In other words, in some embodiments, the driver integrated circuit 76 may be implemented approximately halfway between the first remote head 78A and the second remote head 78B.

To facilitate further improving wireless coverage, as in the depicted example, the front-end circuitry 32 may additionally include a third remote head 78C. In some embodiments, the third remote head 78C may be positioned along a first (e.g., front glass) surface of the electronic device 10 while the first remote head 78A and/or the second remote head 78B are positioned along a second (e.g., back glass or opposite) surface of the electronic device 10. Additionally, as in the depicted example, the third remote head 78C may be positioned along the second (e.g., bottom) end of the electronic device 10 along with the second remote head 78B.

In fact, as in the depicted example, the third remote head 78C may be coupled to the second remote head 78B via a fifth electrical connector 92G, for example, instead of directly to the logic board 94. Additionally or alternatively, as will be described in more detail below, a remote head 78 may be coupled to one or more standalone (e.g., external) antennas 34. In other words, in some embodiments, communication between the logic board 94 and one or more antennas 34 external to a (e.g., second) remote head 78, such as a standalone antenna 34 and/or an antenna 34 of a different remote head 78, may be routed through the remote head 78. In fact, at least in some instances, connecting a remote head 78 in this manner may facilitate reducing implementation associated cost of the front-end circuitry 32, for example, due to proximity of the third remote head 78C to the second remote head 78B resulting in physical footprint of the fifth electrical connector 92G being smaller than an electrical connector 92 that would otherwise be connected between the logic board 94 and the third remote head 78C. Furthermore, as described above, in some embodiments, a remote head 78 may include one or more antennas 34 and routing circuitry 50.

Figure 9:
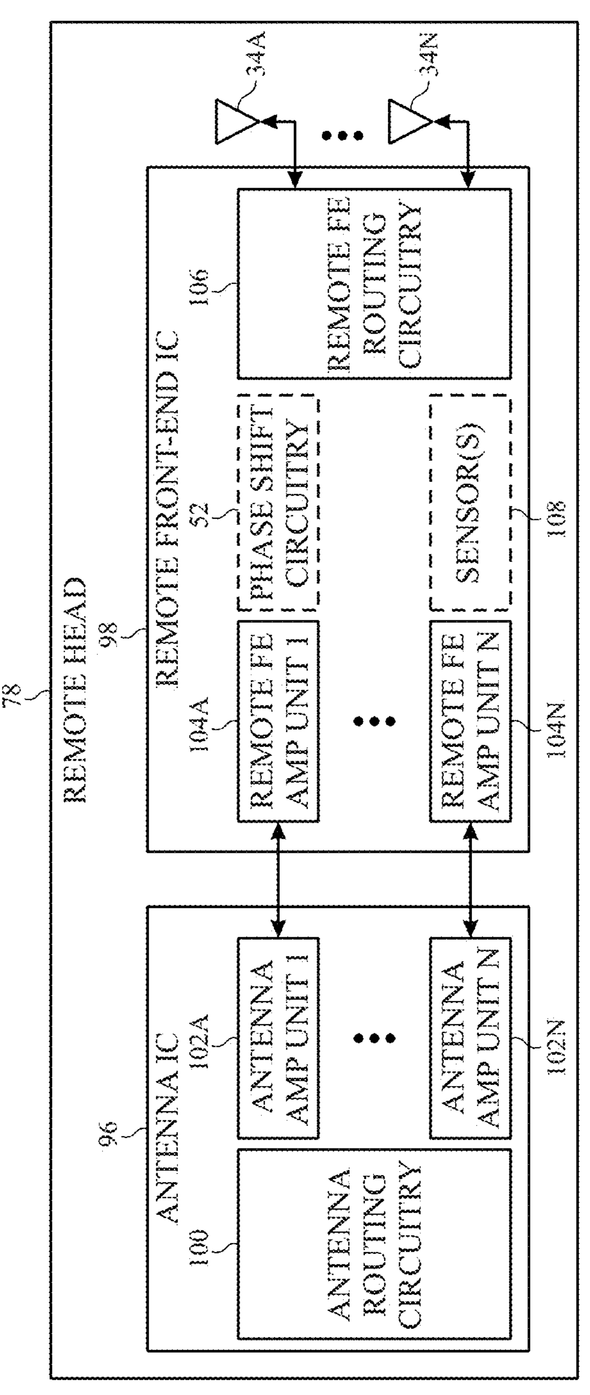
FIG. 9 is block diagram of an example of a remote head of FIG. 7 including a remote front-end integrated circuit, in accordance with an embodiment of the present disclosure.

To help illustrate, an example of a remote head 78, which may be implemented in front-end circuitry 32 of a radio frequency system 12, is shown in FIG. 9. As in the depicted example, a remote head 78 may include an antenna integrated circuit 96, a remote front-end integrated circuit 98, and multiple antennas 34, which include at least a first antenna 34A and an Nth antenna 34N. However, it should be appreciated that the depicted example is merely intended to be illustrative and not limiting. For example, as will be described in more detail below, in some embodiments, the remote front-end integrated circuit 98 may be obviated (e.g., optional) and, thus, not included in the remote head 78. Additionally or alternatively, in some embodiments, the antenna integrated circuit 96 may be obviated (e.g., optional) and, thus, not included in the remote head 78.

As in the depicted example, the antenna integrated circuit 96 may include routing circuitry 50—namely antenna routing circuitry 100—and multiple antenna amplifier units 102. In some embodiments, each antenna amplifier unit 102 may be dedicated to amplifying analog electrical signals communicated via a specific (e.g., corresponding) antenna 34. For example, the antenna integrated circuit 96 may include a first antenna amplifier unit 102A implemented and/or operated to amplify analog electrical signals communicated via the first antenna 34A and an Nth antenna amplifier unit 102N implemented and/or operated to amplify analog electrical signal communicated via the Nth antenna 34N.

Additionally, in some embodiments, each antenna amplifier unit 102 may be dedicated to amplifying a specific (e.g., corresponding) data stream 80. For example, the first antenna amplifier unit 102A may be implemented and/or operated to amplify analog electrical signals in a first data stream 80A and the Nth antenna amplifier unit 102N may be implemented and/or operated to amplify analog electrical signals in a second data stream 80. Furthermore, in some embodiments, each antenna amplifier unit 102 may be dedicated to amplifying a specific (e.g., corresponding) frequency band (e.g., component, range, or spectrum).

Moreover, as in the depicted example, the remote front-end integrated circuit 98 may include routing circuitry 50—namely remote front-end routing circuitry 106—multiple remote front-end (FE) amplifier units 104. In some embodiments, the remote front-end integrated circuit 98 may additionally include phase shift circuitry 52 and/or one or more sensors 108, such as a temperature sensor 108 and/or a power (e.g., voltage and/or current) sensor 108. In fact, in some embodiments, implementing a power sensor 108 in the remote front-end integrated circuit 98 may facilitate determining (e.g., measuring) and, thus, controlling output power of a radio frequency system 12 closer to its antennas 34, which, at least in some instance, may facilitate improving operational efficiency and/or communication reliability of the radio frequency system 12.

As described above, in some embodiments, phase shift circuitry 52 may facilitate implementing beam forming techniques, for example, by generating and/or supplying phase shifted versions of an analog electrical signal to multiple antennas 34 such that additive and/or destructive interference in resulting electromagnetic waves produces one or more electromagnetic wave beams (e.g., concentrated strength) oriented in a target direction (e.g., cell tower or access point). However, it should again be appreciated that the depicted example is merely intended to be illustrative and not limiting. For example, as described above, in other embodiments, the phase shift circuitry 52 may be obviated and, thus, not included in the remote head 78. Moreover, in other embodiments, phase shift circuitry 52 may additionally or alternatively be implemented at least in part in the driver integrated circuit 76, the transceiver integrated circuit 74, the digital processing circuitry 30, or any combination thereof.

Similar to the antenna amplifier units 102, in some embodiments, each remote front-end amplifier unit 104 may be dedicated to amplifying analog electrical signals communicated via a specific (e.g., corresponding) antenna 34. For example, the remote front-end integrated circuit 98 may include a first remote front-end amplifier unit 104A implemented and/or operated to amplify analog electrical signals communicated via the first antenna 34A and an Nth remote front-end amplifier unit 104N implemented and/or operated to amplify analog electrical signal communicated via the Nth antenna 34N. Additionally, in some embodiments, each remote front-end amplifier unit 104 may be dedicated to amplifying a specific (e.g., corresponding) data stream 80. For example, the first remote front-end amplifier unit 104A may be implemented and/or operated to amplify analog electrical signals in the first data stream 80A and the Nth remote front-end amplifier unit 104N may be implemented and/or operated to amplify analog electrical signals in the second data stream 80.

Furthermore, in some embodiments, each remote front-end amplifier unit 104 may be dedicated to amplifying a specific (e.g., corresponding) frequency band (e.g., component, range, or spectrum). As described above, in some embodiments, a data stream 80 may utilize one or more frequency bands. In other words, when one or more data stream 80 communicated therethrough utilizes multiple frequency components, the remote front-end integrated circuit 98 may be implemented and/or operated as a multi-band (e.g., dual-band) remote front-end integrated circuit 98. On the other hand, when each data stream 80 communicated therethrough utilizes a single frequency band, the remote front-end integrated circuit 98 may be implemented and/or operated as a single-band remote front-end integrated circuit 98.

Figure 10:
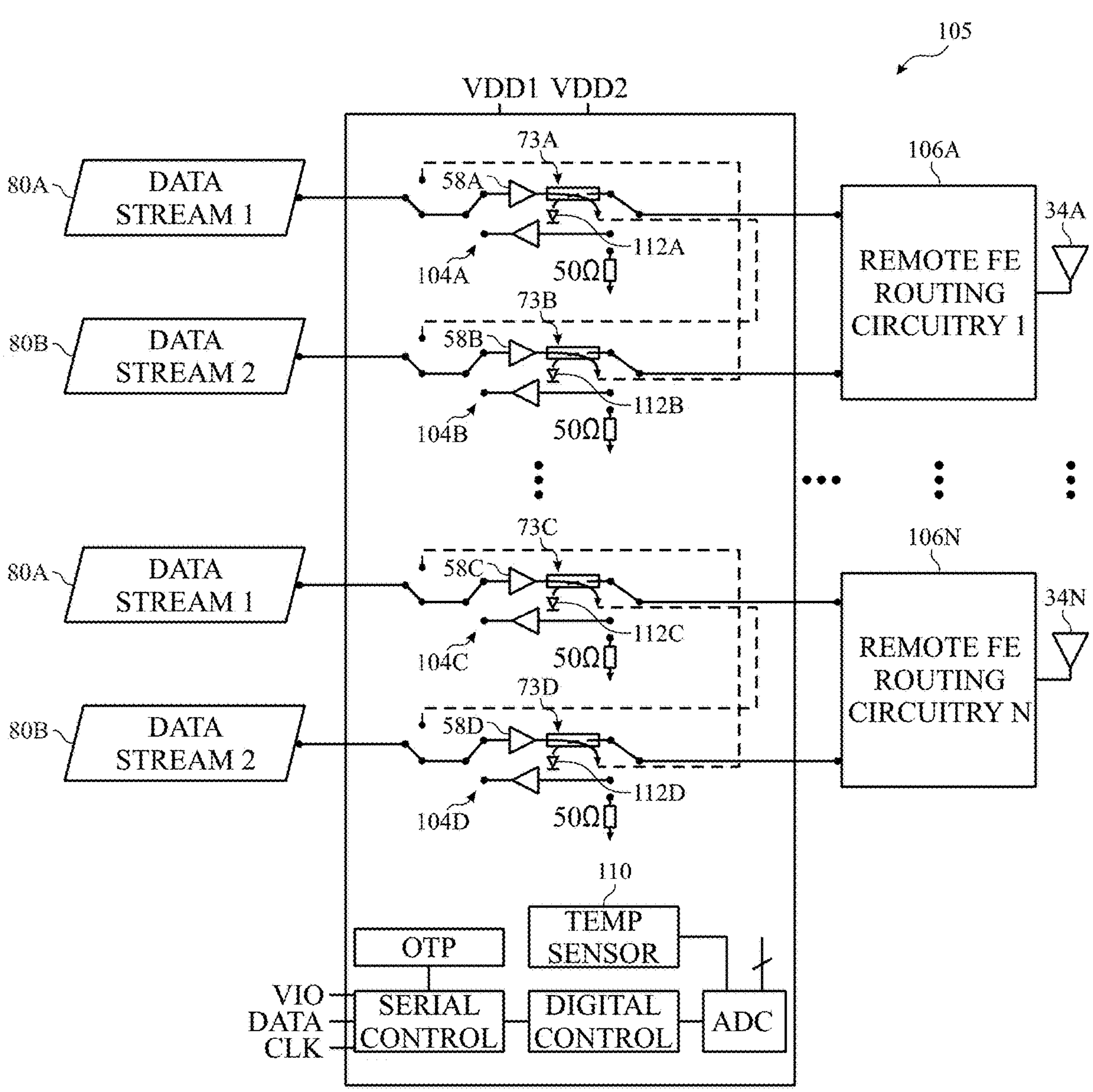
FIG. 10 is block diagram of an example of a single-band remote front-end integrated circuit, in accordance with an embodiment of the present disclosure.
Figure 11:
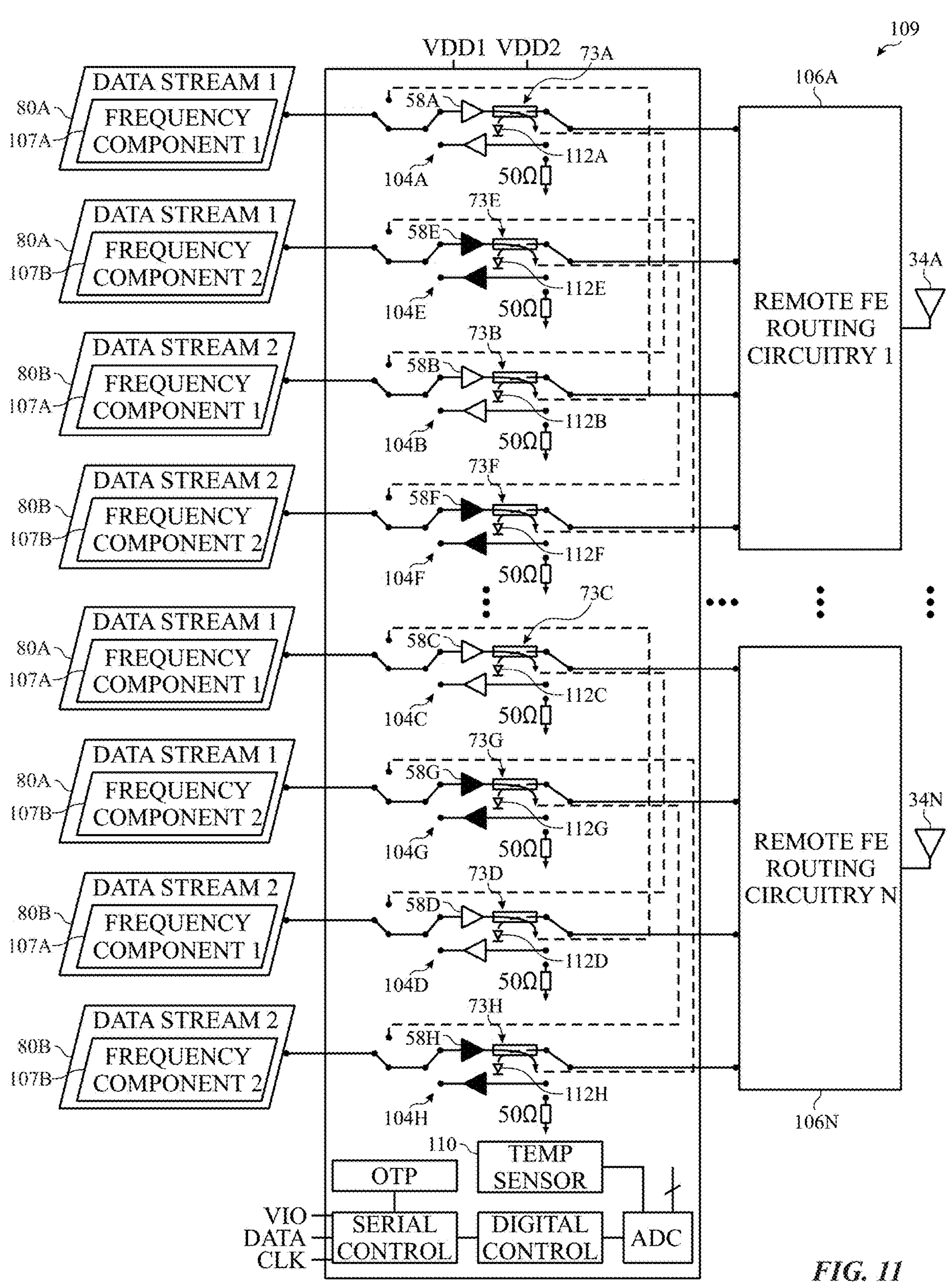
FIG. 11 is block diagram of an example of a dual-band remote front-end integrated circuit, in accordance with an embodiment of the present disclosure.

To help illustrate, an example of a single-band remote front-end integrated circuit 105 is shown in FIG. 10 and an example of a dual-band remote front-end integrated circuit 109 is shown in FIG. 11. As depicted, the single-band remote front-end integrated circuit 105 and the dual-band remote front-end integrated circuit 109 is each implemented and/or operated to facilitate concurrent wireless communication of a first data stream 80A and a second data stream 80B via at least a first antenna 34A and an Nth antenna 34N. In particular, the dual-band remote front-end integrated circuit 109 of FIG. 11 is implemented and/or operated to facilitate concurrent wireless communication of a first (e.g., 28 GHz band) frequency component 107A and a second (e.g., 39 GHz band or 60 GHz band) frequency component 107B in the first data stream 80A and the second data stream 80B. On the other hand, the single-band remote front-end integrated circuit 105 of FIG. 10 is implemented and/or operated to facilitate concurrent wireless communication of a specific (e.g., single) frequency component (e.g., 28 GHz band, 39 GHz band, or 60 GHz band) in the first data stream 80A and a specific frequency component in the second data stream 80B.

To facilitate concurrently communicating the first data stream 80A and the second data stream 80B via the first antenna 34A and the Nth antenna 34N, as in the depicted examples, remote front-end routing circuitry 106 implemented in the remote front-end integrated circuit 98 may include first remote front-end routing circuitry 106A communicatively coupled to the first antenna 34A and Nth remote front-end routing circuitry 106N communicatively coupled to the Nth antenna 34N. Additionally, as in the depicted examples, the first remote front-end routing circuitry 106A may be communicatively coupled to a first set of remote front-end amplifier units 104 and the Nth remote front-end routing circuitry 106N may be communicatively coupled to an Nth set of remote front-end amplifier units 104. However, as depicted and as will be discussed in more detail below, the number of remote front-end amplifier units 104 implemented in different remote front-end integrated circuits 98 may vary, for example, due to number of concurrently communicated frequency components 107, number of concurrently communicated data streams 80, and/or number of concurrently communicating antennas 34 differing.

As described above, in some embodiments, routing circuitry 50 implemented in front-end circuitry 32 of a radio frequency system 12 may include one or more filters 68 and/or one or more combiners 72. For example, the first remote front-end routing circuitry 106A may include a first one or more combiners 72 that, during transmission, operate to combine amplified analog electrical signals output from the first set of remote front-end amplifier units 104 into a first combined analog electrical signal to be supplied to the first antenna 34A. Similarly, the Nth remote front-end routing circuitry 106N may include an Nth one or more combiners 72 that, during transmission, operate to combine amplified analog electrical signals output from the Nth set of remote front-end amplifier units 104 into an Nth combined analog electrical signal to be supplied to the Nth antenna 34N.

Additionally or alternatively, the first remote front-end routing circuitry 106A may include a first one or more filters 68 that, during reception, operate to identify constituent components of an analog electrical signal output from the first antenna 34A. For example, when the first antenna 34A concurrently receives multiple data streams 80, the first one or more filters 68 may operate to separate the analog electrical signal output from the first antenna 34A into multiple analog electrical signals corresponding with the different data streams 80. Additionally, when the first antenna 34A concurrently receives multiple frequency components 107 (e.g., bands, ranges, or spectrums), the first one or more filters 68 may operate to separate the analog electrical signal output from the first antenna 34A into multiple analog electrical signals corresponding with the different frequency bands. Similarly, the Nth remote front-end routing circuitry 106N may include an Nth one or more filters 68 that, during reception, operate to identify constituent components of an analog electrical signal output from the Nth antenna 34N.

However, it should be appreciated that the depicted examples are merely intended to be illustrative and not limiting. For example, in some embodiments, phase shift circuitry 52 may be coupled between the first set of remote front-end amplifier units 104 and the first remote front-end routing circuitry 106A and/or between the Nth set of remote front-end amplifier units 104 and the Nth remote front-end routing circuitry 106N. Additionally or alternatively, phase shift circuitry 52 may be coupled between the first remote front-end routing circuitry 106A and the first antenna 34A and/or between the Nth remote front-end routing circuitry 106N and the Nth antenna 34N.

As described above, in some embodiments, a remote front-end amplifier unit 104 may be implemented and/or operated to amplify a specific data stream 80 communicated via specific antenna 34. Thus, to facilitate concurrently communicating the first data stream 80A and the second data stream 80B via the first antenna 34A, the first set of remote front-end amplifier units 104 in the single-band remote front-end integrated circuit 105 of FIG. 10 and first set of remote front-end amplifier units 104 in the dual-band remote front-end integrated circuit 109 of FIG. 11 may both include a first remote front-end amplifier unit 104A that amplifies the first data stream 80A and a second remote front-end amplifier unit 104B that amplifies the second data stream 80B. Similarly, to facilitate concurrently communicating the first data stream 80A and the second data stream 80B via the Nth antenna 34N, the Nth set of remote front-end amplifier units 104 in the single-band remote front-end integrated circuit 105 of FIG. 10 and Nth set of remote front-end amplifier units 104 in the dual-band remote front-end integrated circuit 109 of FIG. 11 may both include a third remote front-end amplifier unit 104C that amplifies the first data stream 80A and a fourth remote front-end amplifier unit 104D that amplifies the second data stream 80B.

Additionally, as described above, in some embodiments, a remote front-end amplifier unit 104 may be implemented and/or operated to amplify a specific frequency component 107 (e.g., band, range, or spectrum). In other words, in such embodiments, the first remote front-end amplifier unit 104A may be implemented and/or operated to amplify a specific (e.g., first) frequency component 107 (e.g., 28 GHz band) of the first data stream 80A and the second remote front-end amplifier unit 104B may be implemented and/or operated to amplify a specific frequency component 107 of the second data stream 80B. Similarly, in such embodiments, the third remote front-end amplifier unit 104C may be implemented and/or operated to amplify a specific frequency component 107 of the first data stream 80A and the fourth remote front-end amplifier unit 104D may be implemented and/or operated to amplify a specific frequency component 107 of the second data stream 80B.

To facilitate communicating a data stream 80 including multiple frequency components 107, as depicted in FIG. 11, the first set of remote front-end amplifier unit 104 in the dual-band remote front-end integrated circuit 109 additionally includes a fifth remote front-end amplifier unit 104E that amplifies the second (e.g., 39 GHz or 60 GHz) frequency component 107B of the first data stream 80A and a sixth remote front-end amplifier unit 104F that amplifies the second frequency component 107B of the second data stream 80B. Similarly, the Nth set of remote front-end amplifier unit 104 in the dual-band remote front-end integrated circuit 109 additionally includes a seventh remote front-end amplifier unit 104G that amplifies the second frequency component 107B of the first data stream 80A and an eighth remote front-end amplifier unit 104H that amplifies the second frequency component 107B of the second data stream 80B.

As described above, at least in some instances, controlling output power of an antenna 34 closer to the antenna 34 may facilitate improving communication reliability provided by a radio frequency system 12, for example, by reducing the distance an analog electrical signal, which is amplified to achieve a target output (e.g., transmission) power, travels before reaching the antenna 34. In other words, to facilitate improving communication reliability, in some embodiments, output power of an antenna 34 may be controlled by controlling amplification (e.g., gain value) applied by one or more amplifier units 48 of a remote head 78 in which the antenna 34 is implemented and/or to which the (e.g., standalone) antenna 34 is coupled. Additionally, as described above, in some embodiments, remote front-end amplifier units 104 may provide better amplifier performance (e.g., linearity and/or power consumption) compared to antenna amplifier units 102 implemented in an antenna integrated circuit 96 of the remote head 78, for example, due to the antenna integrated circuit 96 and the remote front-end integrated circuit 98 being implemented at least in part using different semiconductor manufacturing techniques.

In fact, leveraging the improved amplifier performance of the remote front-end amplifier units 104, in some embodiments, the gain applied in the remote front-end integrated circuit 98 may be one or more orders of magnitude greater than the gain applied in the antenna integrated circuit 96. In other words, in some embodiments, the gain applied by the remote front-end amplifier units 104 may be controlled (e.g., adjusted) to control output power of electromagnetic waves transmitted from one or more antennas 34 coupled thereto. Additionally, as described above, output power of an antenna 34 generally varies with magnitude (e.g., amplitude) of an analog electrical signal supplied to the antenna 34.

Thus, to facilitate controlling output power, as in the depicted examples, a remote front-end integrated circuit 98 may include power (e.g., voltage and/or current) sensors 112 coupled to its remote front-end amplifier units 104, for example, in addition to a temperature sensor 110. In particular, the power sensors 112 may include a first power sensor 112A that determines magnitude (e.g., amplitude) of an analog electrical signal output from a first transmit amplifier 58A in the first remote front-end amplifier unit 104A and a second power sensor 112B that determines magnitude of an analog electrical signal output from a second transmit amplifier 58B in the second remote front-end amplifier unit 104B. Additionally, the power sensors 112 may include a third power sensor 112C that determines magnitude of an analog electrical signal output from a third transmit amplifier 58C in the third remote front-end amplifier unit 104C and a fourth power sensor 112D that determines magnitude of an analog electrical signal output from a fourth transmit amplifier 58D in the fourth remote front-end amplifier unit 104D.

Furthermore, as in the example depicted in FIG. 11, the dual-band remote front-end integrated circuit 109 may additionally include a fifth power sensor 112E that determines magnitude (e.g., amplitude) of an analog electrical signal output from a fifth transmit amplifier 58E in the fifth remote front-end amplifier unit 104E. Additionally, as in the depicted example, the dual-band remote front-end integrated circuit 109 may include a sixth power sensor 112F that determines magnitude of an analog electrical signal output from a sixth transmit amplifier 58F in the sixth remote front-end amplifier unit 104F. Moreover, as in the depicted example, the dual-band remote front-end integrated circuit 109 may include a seventh power sensor 112G that determines magnitude of an analog electrical signal output from a seventh transmit amplifier 58G in the seventh remote front-end amplifier unit 104G and an eighth power sensor 112H that determines magnitude of an analog electrical signal output from an eighth transmit amplifier 58H in the eighth remote front-end amplifier unit 104H.

To facilitate determining output power, as in the depicted examples, bi-directional couplers 73 may be coupled to between the remote front-end amplifier units 104 and the power sensors 112. For example, a first bi-directional coupler 73A may be coupled between the first remote front-end amplifier unit 104A and the first power sensors 112A. In particular, the first bi-directional coupler 73A may be implemented such that its input terminal is connected to the output of the first transmit amplifier 58A, its output terminal is connected to the output of the first remote front-end amplifier unit 104A, its coupled terminal is connected to the first power sensor 112A, and its isolated terminal is selectively connected the second remote front-end amplifier unit 104B.

Additionally, a second bi-directional coupler 73B may be coupled between the second remote front-end amplifier unit 104B and the second power sensors 112B. In particular, the second bi-directional coupler 73B may be implemented such that its input terminal is connected to the output of the second transmit amplifier 58B, its output terminal is connected to the output of the second remote front-end amplifier unit 104B, its coupled terminal is connected to the second power sensor 112B, and its isolated terminal is selectively connected the first remote front-end amplifier unit 104A. As in the depicted examples, a third bi-directional coupler 73C and a fourth bi-directional coupler 73D may similarly be coupled to the third remote front-end amplifier unit 104C, the third power sensor 112C, the fourth remote front-end amplifier unit 104D, and the fourth power sensor 112D.

Furthermore, as in the example depicted in FIG. 11, the dual-band remote front-end integrated circuit 109 may additionally include a fifth bi-directional coupler 73E coupled between the fifth remote front-end amplifier unit 104E and the fifth power sensor 112E as well as a sixth bi-directional coupler 73F coupled to between the sixth remote front-end amplifier unit 104F and the sixth power sensor 112F. In particular, the fifth bi-directional coupler 73E may be implemented such that its input terminal is connected to the output of the fifth transmit amplifier 58E, its output terminal is connected to the output of the fifth remote front-end amplifier unit 104E, its coupled terminal is connected to the fifth power sensor 112E, and its isolated terminal is selectively connected the sixth remote front-end amplifier unit 104F. Additionally, the sixth bi-directional coupler 73F may be implemented such that its input terminal is connected to the output of the sixth transmit amplifier 58F, its output terminal is connected to the output of the sixth remote front-end amplifier unit 104F, its coupled terminal is connected to the sixth power sensor 112F, and its isolated terminal is selectively connected the fifth remote front-end amplifier unit 104E. As in the depicted example, a seventh bi-directional coupler 73G and an eighth bi-directional coupler 73H may similarly be coupled to the seventh remote front-end amplifier unit 104G, the seventh power sensor 112G, the eighth remote front-end amplifier unit 104H, and the eighth power sensor 112H.

In this manner, the single-band remote front-end integrated circuit 105 of FIG. 10 may be expanded to implement the dual-band remote front-end integrated circuit 109 of FIG. 11. In fact, in an analogous manner, a remote front-end integrated circuit 98 may be expanded to support communication of a data stream 80 including three or more frequency components 107 (e.g., bands or ranges) and/or concurrent communication of three or more data streams 80. In other words, more generally, a remote front-end integrated circuit 98 implemented in this manner may be operated to facilitate concurrent wireless communication of one or more data streams 80 and/or one or more frequency components 107.

Figure 12:
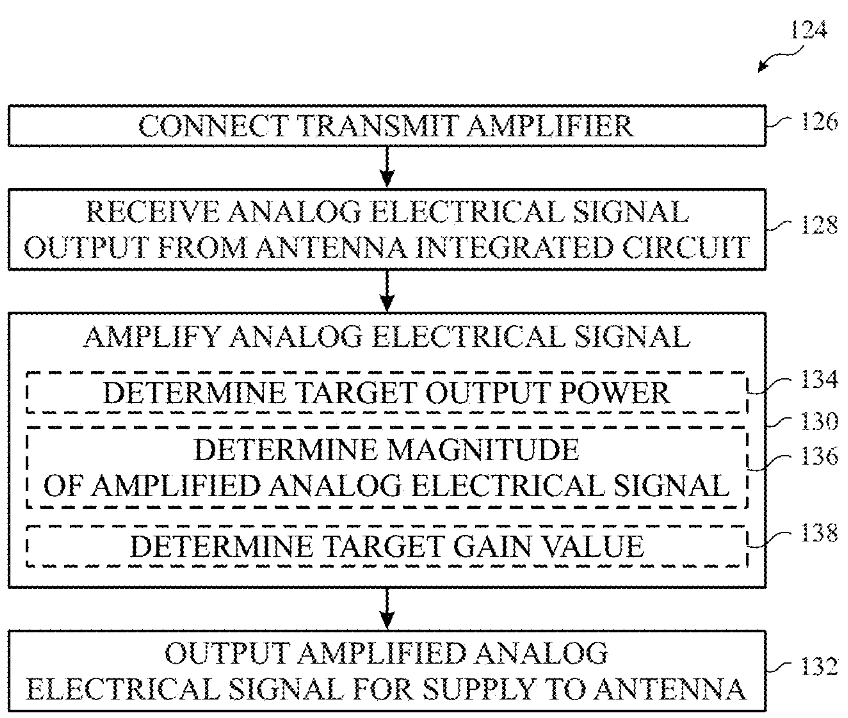
FIG. 12 is a flow diagram of an example process for operating the remote front-end integrated circuit of FIG. 9 in a transmission mode, in accordance with an embodiment of the present disclosure.

To help illustrate, an example of a process 124 for operating a remote front-end integrated circuit 98, which may be deployed in a remote head 78 of a radio frequency system 12, during transmission is described in FIG. 12. Generally, the process 124 includes connecting a transmit amplifier (process block 126), receiving an analog electrical signal output from an antenna integrated circuit (process block 128), amplifying the analog electrical signal (process block 130), and outputting an amplified analog electrical signal for supply to an antenna (process block 132). Although described in a particular order, which represents a particular embodiment, it should be noted that the process 124 may be performed in any suitable order. Additionally, embodiments of the process 124 may omit process blocks and/or include additional process blocks. Moreover, in some embodiments, the process 124 may be implemented at least in part by executing instructions stored in a tangible, non-transitory, computer-readable medium, such as controller memory 40, using processing circuitry, such as the controller processor 38.

Accordingly, in some embodiments, a controller 36 (e.g., control circuitry) may instruct one or more remote front-end amplifier units 104 of a remote front-end integrated circuit 98 to each connect its transmit amplifier 58 (process block 126). As described above, in some embodiments, a remote front-end amplifier unit 104 may include a transmit (e.g., power) amplifier 58 and a receipt (e.g., low noise) amplifier 62 each selectively connectable via a first amplifier switching device 60 and/or a second amplifier switching device 64. Thus, in such embodiments, the controller 36 may instruct the remote front-end amplifier unit 104 to connect its transmit amplifier 58 by supplying a first control signal to the first amplifier switching device 60 and/or a second control signal to the second amplifier switching device 64.

Additionally, as described above, the remote front-end integrated circuit 98 may receive one or more analog electrical signals from an antenna integrated circuit 96, for example, implemented on a remote head 78 along with the remote front-end integrated circuit 98 (process block 128). In some embodiments, the controller 36 may instruct the antenna integrated circuit 96 to output an analog electrical signal by instructing the antenna integrated circuit 96 to connect one or more transmit (e.g., power) amplifiers 58 implemented in its antenna amplifier units 102. The remote front-end amplifier units 104 may then amplify each of the one or more analog electrical signals received from the antenna integrated circuit 96 to generate a corresponding amplified analog electrical signal (process block 130).

As described above, in some embodiments, the gain applied by a remote front-end amplifier unit 104 may control magnitude (e.g., amplitude) of an amplified analog electrical signal output therefrom and, thus, output power of corresponding electromagnetic wave transmitted from an antenna 34. Accordingly, in some embodiments, amplifying an analog electrical signal via a remote front-end amplifier unit 104 may include determining a target output power of an antenna 34 coupled to the remote front-end amplifier unit 104 (process block 134), determining magnitude of an amplified analog electrical signal generated by the remote front-end amplifier unit 104 (process block 136), and determining a target gain value to be applied by the remote front-end amplifier unit 104 (process block 138). As described above, in some embodiments, magnitude (e.g., amplitude) of an amplified analog electrical signal generated by a remote front-end amplifier unit 104 may be determined (e.g., measured) via a power sensor 112 coupled to the remote front-end amplifier unit 104, for example, via a bi-directional coupler 73. In other words, in some embodiments, the controller 36 may determine the magnitude of an amplified analog electrical signal generated by a remote front-end amplifier unit 104 based at least in part on sensor data received from a corresponding power sensor 112.

Additionally, as described above, output power of electromagnetic waves transmitted from an antenna 34 may generally be dependent on magnitude of a corresponding analog electrical signal supplied to the antenna 34. Thus, in some embodiments, the controller 36 may determine expected output (e.g., transmission) power based at least in part on magnitude of the amplified analog electrical signal generated by the remote front-end amplifier unit 104. Additionally, to facilitate achieving the target output (e.g., transmission) power, in some embodiments, the controller 36 may adaptively control the target gain value to be applied by the remote front-end amplifier unit 104, for example, by adjusting the target gain value when the expected output power differs from the target output power by more than a difference threshold.

After amplification, one or more amplified analog electrical signals may be output from the remote front-end amplifier units 104 for supply to corresponding antennas 34 (process block 132). As described above, in some embodiments, phase shift circuitry 52 may be implemented in a remote front-end integrated circuit 98, for example, to facilitate implementing beam forming techniques. In other words, in such embodiments, one or more of the amplified analog electrical signals may be phase-shifted (e.g., time delayed) via phase shift circuitry 52 before supply to corresponding antennas 34.

Additionally, as described above, in some embodiments, remote front-end routing circuitry 106 in the remote front-end integrated circuit 98 may combine amplified analog electrical signals output from multiple remote front-end amplifier units 104 into a combined analog electrical signal, which may be routed to a corresponding antenna 34. An antenna 34 may then modulate electromagnetic waves based on an analog electrical signal received from the remote front-end integrated circuit 98, thereby wirelessly transmitting data indicated by the received analog electrical signal. In other words, a remote front-end integrated circuit 98 implemented in remote head 78 of a radio frequency system 12 may be operate in this manner to facilitate wirelessly transmitting data from the radio frequency system 12 and, thus, an electronic device 10 in which the radio frequency system 12 is implemented. As described above, in some embodiments, a remote front-end integrated circuit 98 implemented in a radio frequency system 12 may additionally or alternatively be operated to facilitate reception of wirelessly transmitted data.

Figure 13:
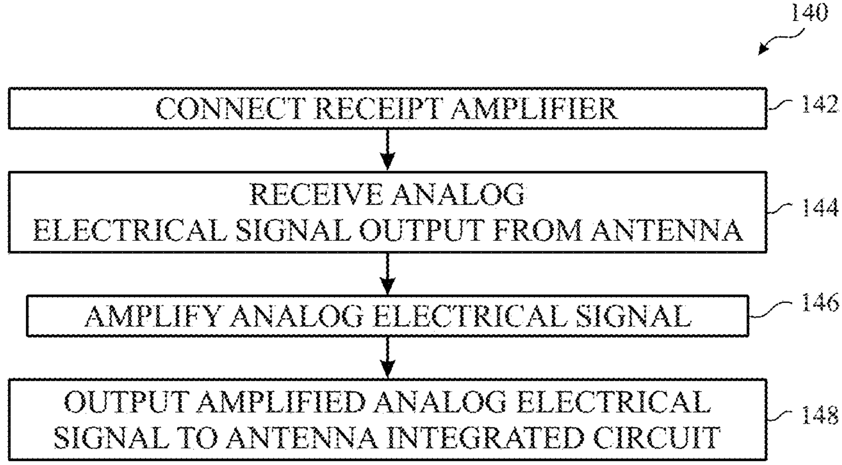
FIG. 13 is a flow diagram of an example process for operating the remote front-end integrated circuit of FIG. 9 in a reception mode, in accordance with an embodiment of the present disclosure.

To help illustrate, an example of a process 140 for operating a remote front-end integrated circuit 98, which may be deployed in a remote head 78 of a radio frequency system 12, during reception is described in FIG. 13. Generally, the process 140 includes connecting a receipt amplifier (process block 142), receiving an analog electrical signal output from an antenna (process block 144), amplifying the analog electrical signal (process block 146), and outputting an amplified analog electrical signal to an antenna integrated circuit (process block 148). Although described in a particular order, which represents a particular embodiment, it should be noted that the process 140 may be performed in any suitable order. Additionally, embodiments of the process 140 may omit process blocks and/or include additional process blocks. Moreover, in some embodiments, the process 140 may be implemented at least in part by executing instructions stored in a tangible, non-transitory, computer-readable medium, such as controller memory 40, using processing circuitry, such as the controller processor 38.

Accordingly, in some embodiments, a controller 36 (e.g., control circuitry) may instruct one or more remote front-end amplifier units 104 of a remote front-end integrated circuit 98 to each connect its receipt amplifier 62 (process block 142). As described above, in some embodiments, a remote front-end amplifier unit 104 may include a transmit (e.g., power) amplifier 58 and a receipt (e.g., low noise) amplifier 62 each selectively connectable via a first amplifier switching device 60 and/or a second amplifier switching device 64. Thus, in such embodiments, the controller 36 may instruct the remote front-end amplifier unit 104 to connect its receipt amplifier 62 by supplying a first control signal to the first amplifier switching device 60 and/or a second control signal to the second amplifier switching device 64.

Additionally, the remote front-end integrated circuit 98 may receive an analog electrical signal output from an antenna 34 based on electromagnetic waves incident on the antenna 34 (process block 136). In some embodiments, the antenna 34 may be implemented on a remote head 78 along with the remote front-end integrated circuit 98. Additionally or alternatively, the antenna 34 may be a standalone (e.g., external) antenna 34 coupled to the remote head 78 on which the remote front-end integrated circuit 98 is implemented. Furthermore, as described above, in some embodiments, remote front-end routing circuitry 106 may filter an analog electrical signal output from an antenna 34 before supply to the remote front-end amplifier units 104, for example, to attenuate noise, to identify one or more data streams 80 indicated via the analog electrical signal, and/or to identify one or more frequency components 107 (e.g., bands, ranges, or spectrums) used to indicate data in the analog electrical signal.

To facilitate overcoming connector loss and/or propagation loss produced during reception, the remote front-end amplifier units 104 may amplify corresponding analog electrical signals, for example, after filtering by the remote front-end routing circuitry 106 and/or phase-shifting by the phase shift circuitry 52 (process block 146). After amplification, one or more amplified analog electrical signals may be output from the remote front-end amplifier units 104 to an antenna integrated circuit 96 (process block 148). As described above, in some embodiments, the antenna integrated circuit 96 may then output an analog electrical signal to a driver integrated circuit 76 and/or a transceiver integrated circuit 74.

During reception, the transceiver integrated circuit 74 may process a received analog electrical signal to enable further processing and/or analysis by the digital processing circuitry 30. For example, the transceiver integrated circuit 74 may convert the analog electrical signal to a processing (e.g., baseband) frequency expected by the digital processing circuitry 30. Additionally or alternatively, the transceiver integrated circuit 74 may convert the analog electrical signal into a digital electrical signal and, thus, from the analog domain to the digital domain. In other words, a remote front-end integrated circuit 98 implemented in remote head 78 of a radio frequency system 12 may be operated in this manner to facilitate receiving data wirelessly transmitted from another radio frequency system 12, a communication network, and/or another electronic device 10.

Figure 14:
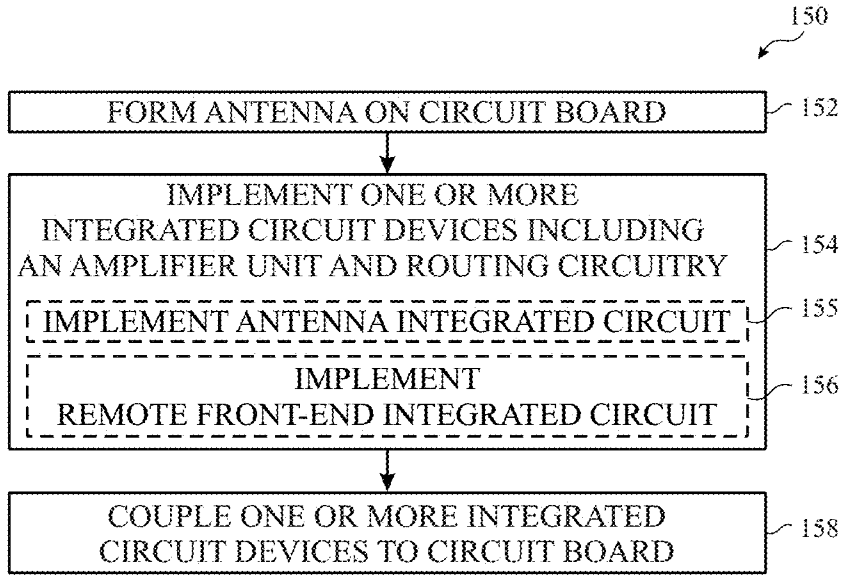
FIG. 14 is a flow diagram of an example process for implementing the remote head of FIG. 9, in accordance with an embodiment of the present disclosure.

An example of a process 150 for implementing a remote head 78 is described in FIG. 14. Generally, the process 150 includes forming an antenna on a circuit board (process block 152), implementing one or more integrated circuit devices including an amplifier unit and routing circuitry (process block 154), and coupling the one or more integrated circuit devices to the circuit board (process block 158). Although described in a particular order, which represents a particular embodiment, it should be noted that the process 150 may be performed in any suitable order. Additionally, embodiments of the process 150 may omit process blocks and/or include additional process blocks. Moreover, in some embodiments, the process 150 may be implemented at least in part by a manufacturer and/or a system integrator, for example, during manufacture of a radio frequency system 12 and/or an electronic device 10 including the radio frequency system 12.

As described above, in some embodiments, one or more antennas 34 to be included in a remote head 78 may be implemented using electrically conductive material formed on an antenna circuit board, such as a printed circuit board (PCB) (process block 152). In other words, in some embodiments, an antenna 34 may be implemented in the remote head 78 at least in part by depositing electrically conductive material on the antenna circuit board, for example, on its bottom surface. Additionally, in some embodiments, one or more of the antennas 34 may be implemented and/or operated as a dual-polarized antenna 34, for example, to enable concurrently communicating a vertically polarized data stream 80 and a horizontally polarized data stream 80.

Furthermore, as described above, a remote head 78 may include routing circuitry 50 and one or more amplifier units 48. In particular, as described above, the routing circuitry 50 and the one or more amplifier units 48 may be implemented in one or more integrated circuit devices (e.g., chips or dies) (process block 154). For example, as described above, a remote head 78 may include an antenna integrated circuit 96 and/or a remote front-end integrated circuit 98.

In other words, in some embodiments, implementing the one or more integrated circuit devices may include implementing an antenna integrated circuit 96 to be included in the remote head 78 (process block 155). As described above, in some embodiments, an antenna integrated circuit 96 may include antenna routing circuitry 100 and one or more antenna amplifier units 102. Accordingly, in such embodiments, the antenna integrated circuit 96 may be implemented at least in part by forming one or more antenna amplifier units 102, forming antenna routing circuitry 100, and coupling the one or more antenna amplifier units 102 to the antenna routing circuitry 100.

Additionally or alternatively, implementing the one or more integrated circuit devices may include implementing a remote front-end integrated circuit 98 to be included in the remote head 78 (process block 156). As described above, in some embodiments, a remote front-end integrated circuit 98 may include remote front-end routing circuitry 106 and one or more remote front-end amplifier units 104. Accordingly, in such embodiments, the antenna integrated circuit 96 may be implemented at least in part by forming one or more remote front-end amplifier units 104, forming remote front-end routing circuitry 106, and coupling the one or more remote front-end amplifier units 104 to the remote front-end routing circuitry 106.

More specifically, in some embodiments, the remote front-end integrated circuit 98 may include a substrate formed from a semiconductor material. For example, the substrate may be formed using gallium arsenide (GaA) and/or gallium-nitride (GaN). Additionally or alternatively, the substrate may be formed at least in part using silicon. To facilitate improving amplifier performance (e.g., improve linearity and/or reduce power consumption), in some embodiments, one or more passive (e.g., dielectric or insulating) layers may be embedded in the substrate, for example, below a thin upper (e.g., top) layer of silicon. As an illustrative example, a first (e.g., top) passive layer may be formed from a silicon oxide or sapphire. Additionally or alternatively, a second (e.g., bottom) passive layer may be a trap-rich layer, for example, formed from polysilicon.

After the substrate is formed, remote front-end routing circuitry 106 may be formed by depositing material on the substrate and/or selectively removing (e.g., etching) material deposited on the substrate. Additionally, remote front-end amplifier circuitry to be used to implement one or more remote front-end amplifier units 104 may be formed by depositing material on the substrate and/or selectively removing (e.g., etching) material deposited on the substrate. To facilitate improving amplifier performance, in some embodiments, one or more of the remote front-end amplifier units 104 may be implemented as a gallium arsenide (GaA) power amplifier or a gallium-nitride (GaN) power amplifier.

The remote front-end routing circuitry 106 and the one or more remote front-end amplifier units 104 may be electrically connected via conductive traces, for example, formed (e.g., etched) on the substrate. In some embodiments, implementing the remote front-end integrated circuit 98 may additionally include coupling phase shift circuitry 52 between the remote front-end amplifier units 104 and the remote front-end routing circuitry 106. Additionally or alternatively, implementing the remote front-end integrated circuit 98 may include connecting a power sensor 112 and a bi-directional coupler 73 to one or more of the remote front-end amplifier units 104, for example, to facilitate determining and, thus, controlling output (e.g., transmission) power closer to the antennas 34. In this manner, a remote front-end integrated circuit 98 may implemented as an integrated circuit device, for example, distinct from an antenna integrated circuit 96.

In other words, in some embodiments, routing circuitry 50 and/or amplifier units 48 to be included in a remote head 78 may be implemented via multiple distinct (e.g., separate and/or different) integrated circuit devices (e.g., antenna integrated circuit 96 and remote front-end integrated circuit 98). For example, routing functions to be performed by the remote head 78 may be divided between the antenna routing circuitry 100 implemented in the antenna integrated circuit 96 and the remote front-end routing circuitry 106 implemented in the remote front-end integrated circuit 98. Additionally or alternatively, amplification functions to be performed by the remote head 78 may be divided between one or more antenna amplifier units 102 implemented in the antenna integrated circuit 96 and one or more remote front-end amplifier units 104 implemented in the remote front-end integrated circuit 98.

As described above, implementing the remote head 78 in this manner may enable the antenna integrated circuit 96 and the remote front-end integrated circuit 98 to be implemented (e.g., manufactured) at least in part using different semiconductor manufacturing techniques, which, at least in some instances, provide varying tradeoffs. For example, to facilitate reducing implementation associated cost, the antenna integrated circuit 96 may be implemented using bulk CMOS manufacturing techniques. Additionally, to facilitate improving communication reliability, the remote front-end integrated circuit 98 may be implemented at least in part using a different semiconductor manufacturing technique, such as a radio frequency (RF) silicon-on-insulator (SOI) manufacturing technique, a gallium-arsenide (GaAs) manufacturing technique, a silicon-germanium (SiGe) BiCMOS manufacturing technique, a gallium-nitride (GaN) manufacturing technique, another embedded passive manufacturing technique, a surface mounted technology (SMD) technique, or any combination thereof.

To implement the remote head 78, the one or more integrated circuit devices, such as the antenna integrated circuit 96 and/or the remote front-end integrated circuit 98, may be coupled to the antenna circuit board, for example, on a (e.g., top) surface opposite the (e.g., bottom) surface on which the one or more antennas 34 are implemented (process block 158). In some embodiments, implementing a remote head 78 may additionally include forming one or more terminals, for example, to enable the remote head 78 to communicate with a (e.g., main) logic board 94, a driver integrated circuit 76, a transceiver integrated circuit 74, another remote head 78, an external (e.g., standalone) antenna 34, or any combination thereof. Moreover, as described above, in some embodiments, one or more integrated circuit devices to be included in a remote head 78 may be implemented in a system-in-package (SiP), for example, to facilitate improving implementation flexibility and/or reducing implementation associated cost. In other words, in some embodiments, the antenna integrated circuit 96 and/or the remote front-end integrated circuit 98 to be included in the remote head 78 may be implemented at least in part in a system-in-package.

Figure 15:
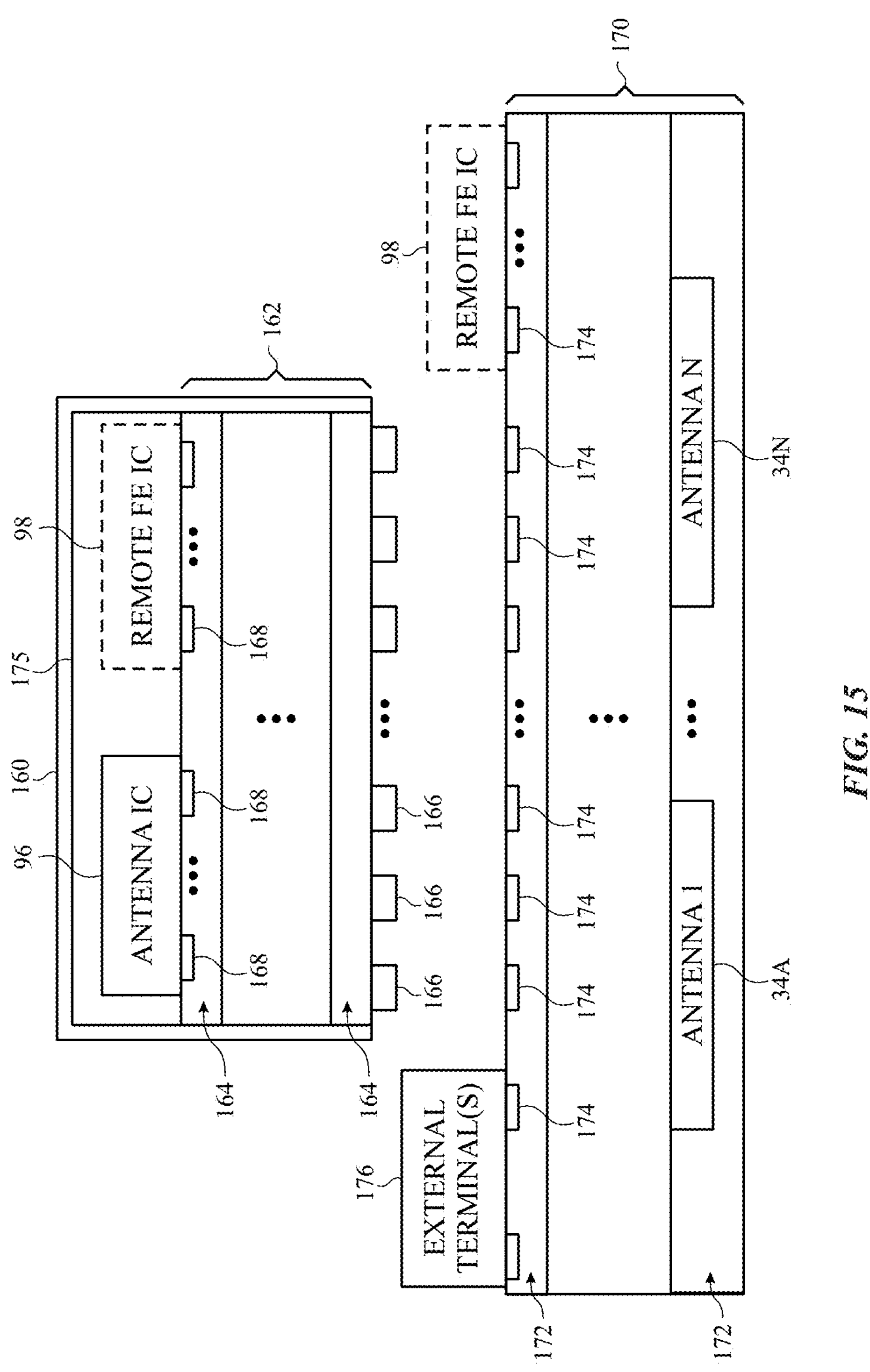
FIG. 15 is a side view of an example of the remote head of FIG. 9 implemented at least in part using a system in package (SiP), in accordance with an embodiment of the present disclosure.

To help illustrate, an example of a remote head 78 including a remote head system-in-package (SiP) 160 is shown in FIG. 15. As in the depicted example, the remote head system-in-package 160 may include a SiP circuit board 162, such as a printed circuit board (PCB), with one or more (e.g., conductive and/or insulating) layers 164, one or more pins 166 (e.g., terminals) formed on a first (e.g., bottom) surface, and one or more pads 168 (e.g., terminals) formed on a second (e.g., opposite or top) surface. Additionally, as in the depicted example, one or more integrated circuit devices (e.g., chips or dies), such as an antenna integrated circuit 96 and/or a remote front-end integrated circuit 98, may be coupled to the pads 168 formed on the second surface of the SiP circuit board 162.

In some embodiments, one or more conductive traces may be formed on a conductive (e.g., metal) layer 164 of the SiP circuit board 162. Additionally or alternatively, one or more conductive vias may be formed through an insulating (e.g., semiconductor or silicon) layer 164 of the SiP circuit board 162. In other words, in some embodiments, the antenna integrated circuit 96 and/or the remote front-end integrated circuit 98 may be communicatively coupled to the pins 166 via conductive traces formed on one or more conductive layers 164 of the SiP circuit board 162 and/or conductive vias formed through one or more insulating layers 164 of the SiP circuit board 162.

Similar to the SiP circuit board 162, as in the depicted example, an antenna circuit board 170 may include one or more (e.g., conductive and/or insulating) layers 172. In other words, in some embodiments, the SiP circuit board 162 may be a first PCB and the antenna circuit board 170 may be a second (e.g., separate and/or distinct) PCB. Additionally, as in the depicted example, multiple antennas 34 may be implemented on a first (e.g., bottom) surface of the antenna circuit board 170 and one or more pads 174 (e.g., terminals) may be formed on a second (e.g., opposite or top) surface of the antenna circuit board 170.

Furthermore, as in the depicted example, one or more external terminals 176 may be coupled to the remote head 78 via one or more pads 174 on the antenna circuit board 170. In some embodiments, an external terminal 176 may be implemented and/or operated to enable the remote head 78 to communicate with one or more components external to the remote head 78, such as a (e.g., main) logic board 94, a driver integrated circuit 76, a transceiver integrated circuit 74, another remote head 78, an external (e.g., standalone) antenna 34, or any combination thereof. For example, an external terminal 176 may include a coaxial cable terminal and/or a solder pad.

Moreover, as in the depicted example, the remote head system-in-package 160 may be coupled to one or more of pads 174 on the antenna circuit board 170 via one or more pins 166 on its SiP circuit board 162. Similar to the SiP circuit board 162, in some embodiments, one or more conductive traces may be formed on a conductive (e.g., metal) layer 172 of the antenna circuit board 170. Additionally or alternatively, one or more conductive vias may be formed through an insulating (e.g., semiconductor or silicon) layer 172 of the antenna circuit board 170. In other words, in some embodiments, the remote head system-in-package 160 and, thus, one or more integrated circuit devices implemented therein may be communicatively coupled to one or more antennas 34 via conductive traces formed on one or more conductive layers 172 of the antenna circuit board 170 and/or conductive vias formed through one or more insulating layers 172 of the antenna circuit board 170.

As described above, electromagnetic waves (e.g., interference) incident on electrically conductive material may induce electrical current therein, which, at least in some instances, may introduce noise in a concurrently communicated electrical signal, for example, by distorting the electrical signal. To facilitate reducing likelihood and/or magnitude of external electromagnetic interference, as in the depicted example, the remote head system-in-package 160 may include electromagnetic shielding 175, such as an electromagnetic shield can, implemented to block electromagnetic interference from reaching electrically conductive material implemented therein, such as a conductive trace formed on a conductive layer 164 of the SiP circuit board 162, a conductive via formed through an insulating layer of the SiP circuit board 162, the antenna integrated circuit 96 coupled to the SiP circuit board 162, the remote front-end integrated circuit 98 coupled to the SiP circuit board 162, or any combination thereof. For example, the electromagnetic shielding 175 may be enclose the SiP board 162 and one or more integrated circuit devices, such as the antenna integrated circuit 96 and/or the remote front-end integrated circuit 98, included in the remote head system-in-package 160.

In fact, in some embodiments, implementing a remote head system-in-package 160 with its own electromagnetic shielding 175 may facilitate reducing implementation associated cost of the remote head 78, for example, by enabling a reduction in physical footprint (e.g., size) of the remote head 78. In particular, as described above, electromagnetic shielding 175 may be included in a remote head system-in-package 160 to block electromagnetic interference from reaching electrically conductive material implemented therein. Accordingly, at least in some instances, implementing the remote head system-in-package 160 with its own electromagnetic shielding 175 may obviate implementing additional and/or separate electromagnetic shielding around the antenna circuit board 170 and/or the remote head 78 as a whole. In other words, at least in some instances, implementing the remote head system-in-package 160 with its own electromagnetic shielding 175 may enable reducing number and/or total area of electromagnetic shielding implemented in a remote head 78.

However, it should be appreciated that the depicted example is merely intended to be illustrative and not limiting. In particular, in other embodiments, a remote head system-in-package 160 may not include its own electromagnetic shielding 175, for example, when a remote head 78 is implemented with electromagnetic shielding 175 that encloses the remote head 78 as a whole. Additionally or alternatively, the antenna integrated circuit 96 and/or the remote front-end integrated circuit 98 may be implemented external to the remote head system-in-package 160. For example, the remote front-end integrated circuit 98 may instead be directly coupled to the antenna circuit board 170 of the remote head 78. Furthermore, in some embodiments, an external terminal 176 may be directly coupled to the remote head system-in-package 160, for example, instead of the antenna circuit board 170.

In addition to facilitating a reduction in implementation associated cost, in some embodiments, implementing one or more integrated circuit devices of a remote head 78 in a system-in-package (SiP) may facilitate improving deployment (e.g., implementation) flexibility. In particular, as described above, at least in some instances, different radio frequency systems 12 may utilize different antenna configurations, for example, due to differing size and/or form factor constraints. As an illustrative example, a larger electronic device 10 may have more available space within its housing and, thus, its radio frequency system 12 may include more antennas 34 compared to a smaller electronic device 10, for example, to facilitate improving wireless (e.g., cellular) coverage and/or communication reliability.

Additionally, as described above, an antenna 34 to be included in a radio frequency system 12 may be implemented in and/or coupled to a remote head 78. In fact, in some embodiments, remote heads 78 in the same radio frequency system 12 may employ different antenna configurations. For example, a first remote head 78A may include four antennas 34 while a different remote head 78 includes two antennas 34. Nevertheless, in some embodiments, remote heads 78 utilized to support different antenna configurations may include common circuitry features. To facilitate improving implementation flexibility, in some embodiments, one or more of the common circuitry features may be implemented in a remote head system-in-package 160, thereby enabling the same system-in-package design to be used in remote heads 78 implemented and/or operated to support differing antenna configurations.

Figure 16:
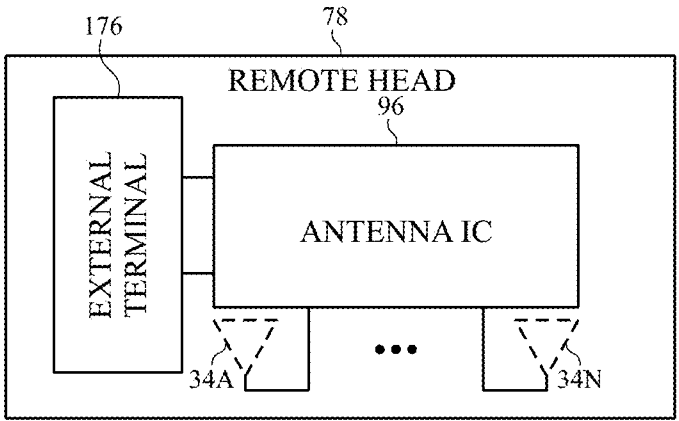
FIG. 16 is a schematic diagram of an example of the remote head of FIG. 9 including multiple antennas, in accordance with an embodiment of the present disclosure.
Figure 17:
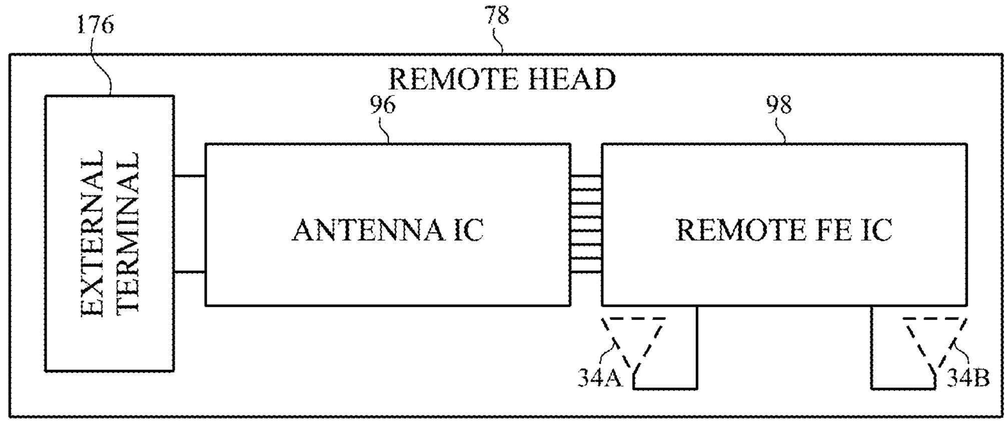
FIG. 17 is a schematic diagram of an example of the remote head of FIG. 9 including two antennas, in accordance with an embodiment of the present disclosure.
Figure 18:
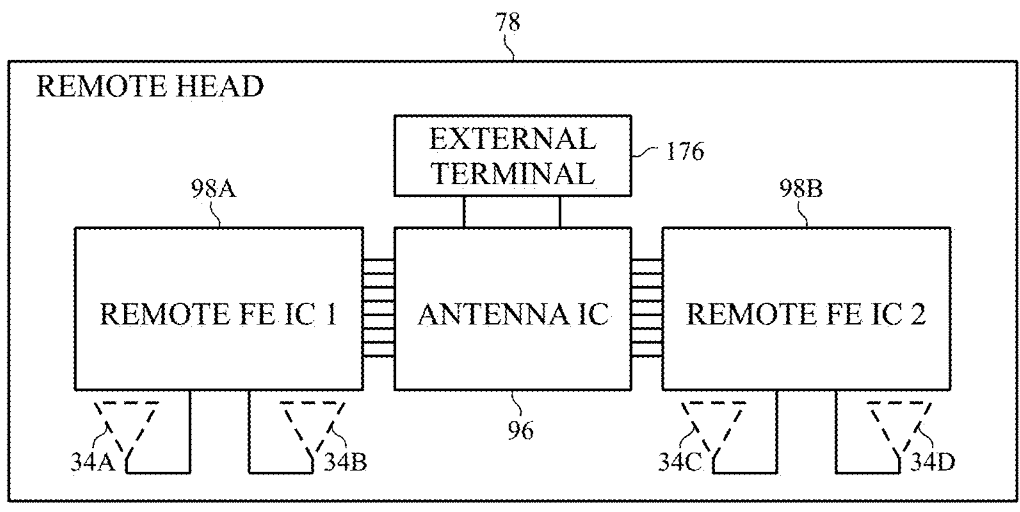
FIG. 18 is a schematic diagram of an example of the remote head of FIG. 9 including four antennas, in accordance with an embodiment of the present disclosure.

To help illustrate, examples of a remote head 78 implemented to support different antenna configurations are shown in FIGS. 16-18. As in the depicted examples, the remote head 78 may include an external terminal 176 and an antenna integrated circuit 96 coupled to the external terminal 176. Additionally, as in the depicted examples, a remote head 78 may include multiple antennas 34A.

In particular, the remote head 78 of FIG. 16 includes multiple (e.g., 2, 3, 4, or more) antennas 34—including at least a first antenna 34A and an Nth antenna 34N—coupled to its antenna integrated circuit 96. As described above, in some embodiments, an antenna integrated circuit 96 may include one or more antenna amplifier units 102. Thus, in such embodiments, one or more antenna amplifier units 102 in the antenna integrated circuit 96 may be implemented and/or operated to amplify analog electrical signals communicated with each of the multiple antennas 34. However, as described above, due at least in part to the semiconductor manufacturing technique used to implement an antenna integrated circuit 96, in some embodiments, gain (e.g., amplification) applied by the antenna integrated circuit 96 and, thus, output (e.g., transmission) power from the antennas 34 may be limited.

To facilitate leveraging tradeoffs between semiconductor manufacturing techniques, the remote head 78 of FIG. 17 includes a remote front-end integrated circuit 98 in addition to its antenna integrated circuit 96 and two antennas 34—namely a first antenna 34A and a second antenna 34B. In particular, as depicted, the first antenna 34A and the second antenna 34B are each coupled to the remote front-end integrated circuit 98, for example, instead of directly to the antenna integrated circuit 96. As described above, in some embodiments, a remote front-end integrated circuit 98 may include one or more remote front-end amplifier units 104. Thus, in such embodiments, one or more remote front-end amplifier units 104 in the remote front-end integrated circuit 98 may be implemented and/or operated to amplify analog electrical signals communicated with the first antenna 34A and/or the second antenna 34B.

To facilitate increasing the number antennas 34, the remote head of FIG. 18 includes two remote front-end integrated circuits 98—namely a first remote front-end integrated circuit 98A and a second remote front-end integrated circuit 98B—in addition to its antenna integrated circuit 96 and four antennas 34—namely a first antenna 34A, a second antenna 34B, a third antenna 34C, and a fourth antenna 34D. In particular, as depicted, the first antenna 34A and the second antenna 34B are each coupled to the first remote front-end integrated circuit 98. Additionally, as depicted, the third antenna 34C and the fourth antenna 34D are each coupled to the second remote front-end integrated circuit 98B.

As described above, in some embodiments, a remote front-end integrated circuit 98 may include one or more remote front-end amplifier units 104. For example, in such embodiments, the first remote front-end integrated circuit 98A may include a first one or more remote front-end amplifier units 104 and the second remote front-end integrated circuit 98B may include a second one or more remote front-end amplifier units 104. In other words, in such embodiments, the first one or more remote front-end amplifier units 104 in the first remote front-end integrated circuit 98A may be implemented and/or operated to amplify analog electrical signals communicated with the first antenna 34A and/or the second antenna 34B. Additionally, the second one or more remote front-end amplifier units 104 in the second remote front-end integrated circuit 98B may be implemented and/or operated to amplify analog electrical signals communicated with the third antenna 34C and/or the fourth antenna 34D.

Furthermore, as described above, an external terminal 176 of a remote head 78 may be implemented and/or operated to enable the remote head 78 to communicate with one or more components external to the remote head 78. For example, the external terminal 176 may be implemented and/or operated to enable the remote head 78 to communicate with a driver integrated circuit 76 and/or a transceiver integrated circuit 74 on a (e.g., main) logic board 94 of a radio frequency system 12, thereby enabling the radio frequency system 12 and, thus, an electronic device 10 in which the radio frequency system 12 is deployed to wirelessly communicate with another electronic device 10 and/or a communication network via one or more antennas 34 of the remote head 78. As described above, an external terminal 176 of a remote head 78 in a radio frequency system 12 may additionally or alternatively be implemented and/or operated to enable the remote head 78 to communicate with one or more antennas 34 in the radio frequency system 12 external to the remote head 78, for example, implemented in another remote head 78 and/or as standalone antennas 34.

Figure 19:
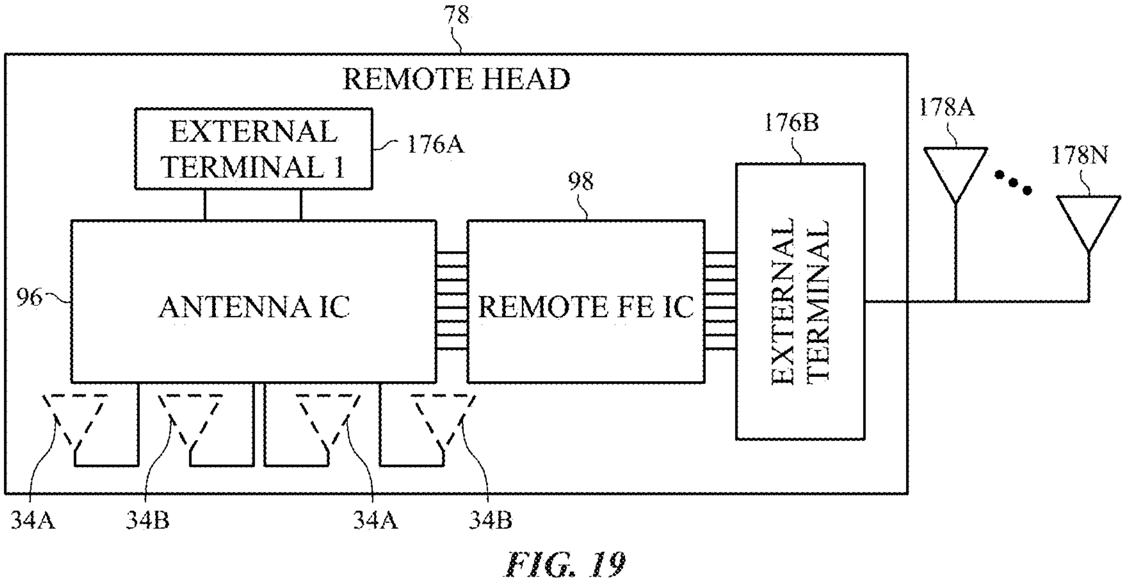
FIG. 19 is a schematic diagram of an example of the remote head of FIG. 9 including four antennas and coupled to two external antennas, in accordance with an embodiment of the present disclosure.

To help illustrate, an example of a remote head 78 implemented to support an antenna configuration including standalone antennas 178 is shown in FIG. 19. As depicted, the remote head 78 includes a first external terminal 176A, a second external terminal 176B, an antenna integrated circuit 96 coupled to the first external terminal 176A, four antennas 34—namely a first antenna 34A, a second antenna 34B, a third antenna 34C, and a fourth antenna 34D—coupled to the antenna integrated circuit 96, and a remote front-end integrated circuit 98 coupled between the antenna integrated circuit 96 and the second external terminal 176B. In some embodiments, the first external terminal 176A may be implemented and/or operated to enable the remote head 78 to communicate with a driver integrated circuit 76 and/or a transceiver integrated circuit 74 on a (e.g., main) logic board 94 of a radio frequency system 12.

On the other hand, as depicted, the second external terminal 176B is coupled to multiple standalone antennas 178, which include at least a first standalone antenna 178A and an Nth standalone antenna 178N. As such, in some embodiments, analog electrical signals communicated between the standalone antennas 34 and the logic board 94 may be routed through the remote head 78. For example, one or more remote front-end amplifier units 104 in the remote front-end integrated circuit 98 may be implemented and/or operated to amplify analog electrical signals communicated with the standalone antennas 178. On the other hand, one or more antenna amplifier units 102 in the antenna integrated circuit 96 may be implemented and/or operated to amplify analog electrical signals communicated with the four antennas 178 implemented in (e.g., internal to) the remote head 78.

Due at least in part to tradeoffs resulting from semiconductor manufacturing techniques used to implement its antenna integrated circuit 96 and its remote front-end integrated circuit 98, in some embodiments, implementing a remote head 78 in this manner may enable higher output power from a standalone antenna 178 coupled thereto compared to its own antennas 34. As described above, in some embodiments, an external terminal 176 of a remote head 78 may additionally or alternatively be implemented to enable the remote head 78 to communicate with one or more antennas 34 implemented in another remote head 78. In other words, in some embodiments, the remote head 78 may be implemented and/or operated to facilitate wireless communication (e.g., transmission and/or reception) via an antenna 34 of a different remote head 78 in the radio frequency system 12.

Figure 20:
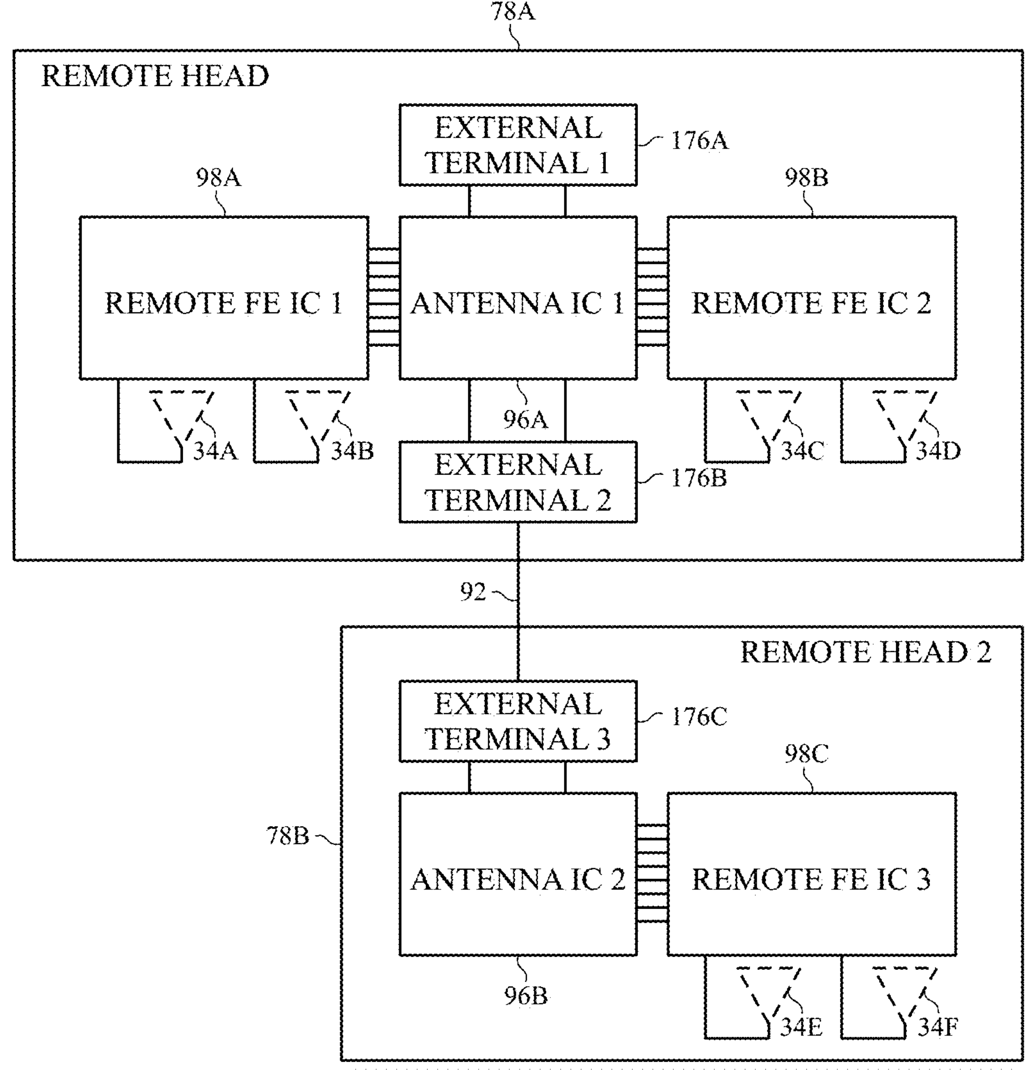
FIG. 20 is a schematic diagram of an example of a first remote head including four antennas coupled to a second remote head including two antennas, in accordance with an embodiment of the present disclosure.
Figure 21:
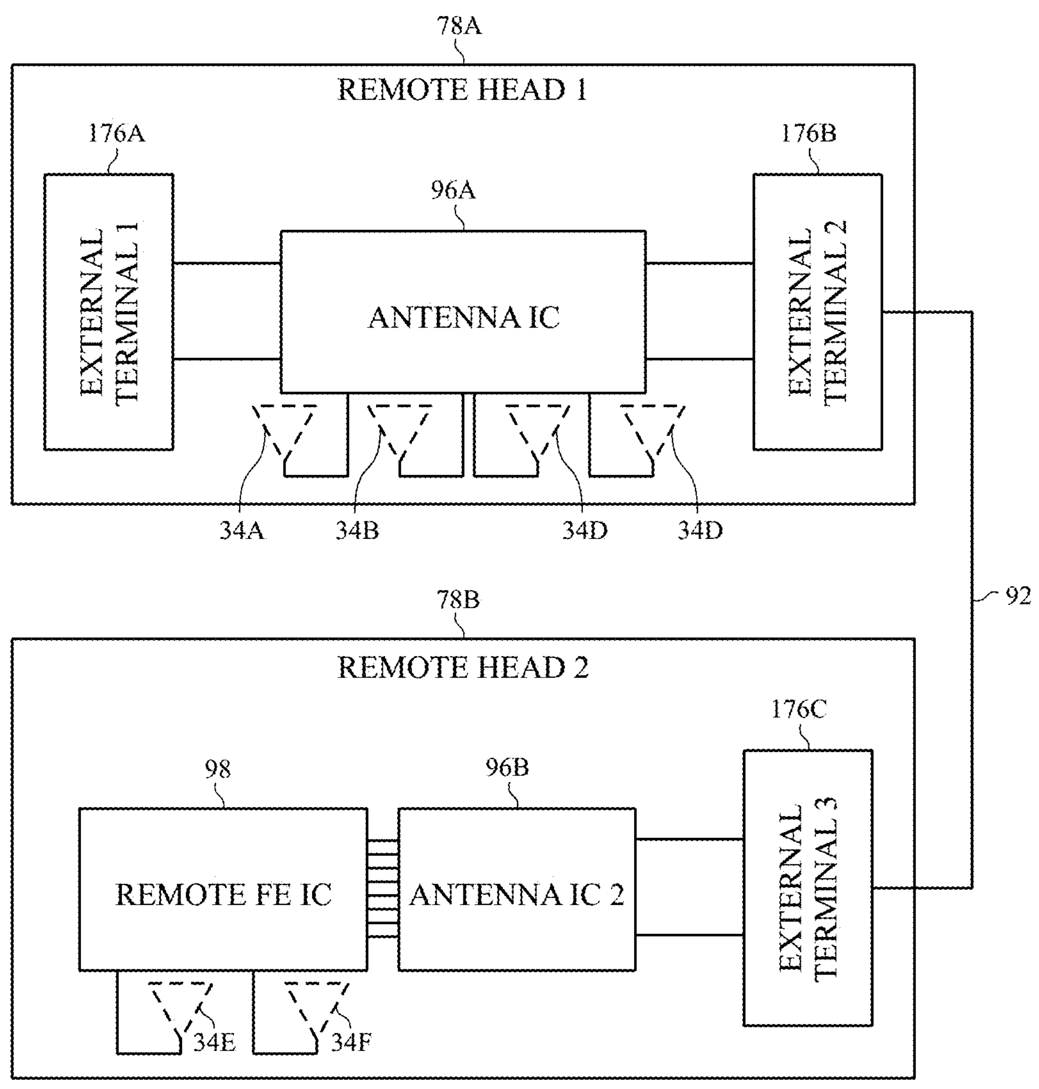
FIG. 21 is a schematic diagram of another example of a first remote head including four antennas coupled to a second remote head including two antennas, in accordance with an embodiment of the present disclosure.
Figure 22:
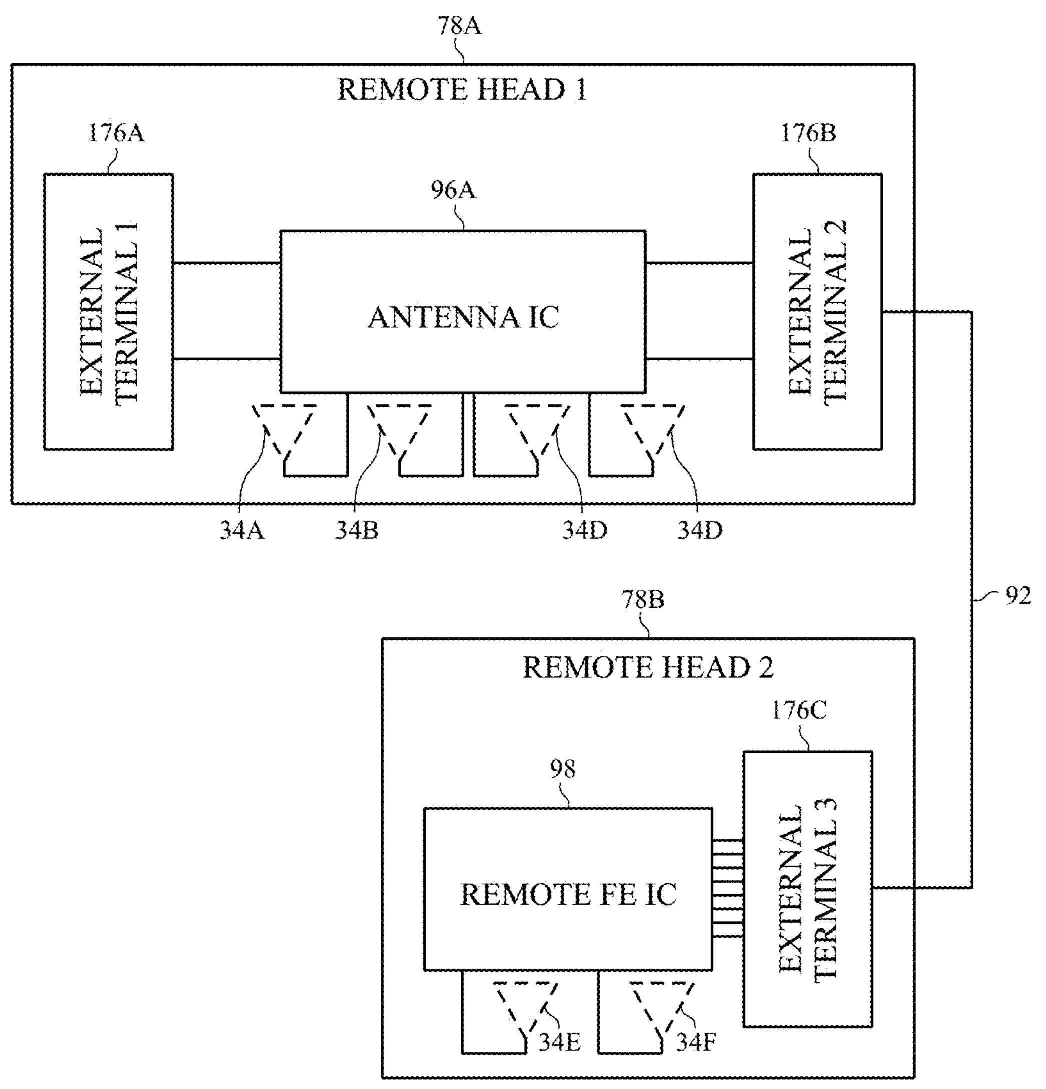
FIG. 22 is a schematic diagram of another example of a first remote head including four antennas coupled to a second remote head including two antennas, in accordance with an embodiment of the present disclosure.

To help illustrate, examples of a first remote head 78A and a second remote head 78B implemented to support different antenna configurations are shown in FIGS. 20-22. As in the depicted examples, the first remote head 78A may include a first external terminal 176A, a second external terminal 176B, an antenna integrated circuit 96 (e.g., first antenna integrated circuit 96A), and four antennas 34—namely a first antenna 34A, a second antenna 34B, a third antenna 34C, and a fourth antenna 34D. In some embodiments, the first external terminal 176A may be implemented and/or operated to enable the first remote head 78 to communicate with a driver integrated circuit 76 and/or a transceiver integrated circuit 74 implemented on a (e.g., main) logic board 94 of a radio frequency system 12.

Additionally, as in the depicted examples, the second remote head 78B may include a third external terminal 176, a remote front-end integrated circuit 98 (e.g., third remote front-end integrated circuit 98C), and two antennas—namely a fifth antenna 34E and a sixth antenna 34F—coupled to the remote front-end integrated circuit 98. In other words, in some embodiments, one or more remote front-end amplifier units 104 in the remote front-end integrated circuit 98 of the second remote head 78B may be implemented and/or operated to amplify analog electrical signals communicated with the fifth antenna 34E and/or the sixth antenna 34F. Furthermore, as in the depicted examples, the second remote head 78B may be connected to the first remote head 78A via one or more electrical connectors 92 (e.g., flex cables) coupled between the second external terminal 176B of the first remote head 78A and the third external terminal 176C of the second remote head 78B. As such, in some embodiments, analog electrical signals communicated between the second remote head 78B and the logic board 94 may be routed through the first remote head 78A.

As in the example depicted in FIG. 20, the first remote head 78A may additionally include a first remote front-end integrated circuit 98A, which is coupled to the first antenna 34A and the second antenna 34B, and a second remote front-end integrated circuit 98B, which is coupled to the third antenna 34C and the fourth antenna 34D. As such, in some embodiments, a first one or more remote front-end amplifier units 104 in the first remote front-end integrated circuit 98A may be implemented and/or operated to amplify analog electrical signals communicated with the first antenna 34A and/or the second antenna 34B. Additionally or alternatively, a second one or more remote front-end amplifier units 104 in the second remote front-end integrated circuit 98B may be implemented and/or operated to amplify analog electrical signals communicated with the third antenna 34C and/or the fourth antenna 34D.

In some embodiments, different remote heads 78 in a radio frequency system 12 may be implemented and/or operated to produce differing output powers, for example, to facilitate overcoming differing propogation losses experienced by the remote heads 78 and/or due to the remote heads 78 including differing number of antennas 34. In other words, in some embodiments, the first remote head 78A and the second remote head 78B may be implemented and/or operated to enable higher output powers from the antennas 34 of the second remote head 78B compared to the antennas 34 of the first remote head 78A. In such embodiments, as in the examples depicted in FIGS. 21 and 22, the antennas 34 of the first remote head 78A may be connected to the antenna integrated circuit 96 (e.g., first antenna integrated circuit 96A) of the first remote head 78A, for example, instead of a remote front-end integrated circuit 98. In other words, in such embodiments, the antenna integrated circuit 96 in the first remote head 78A may be implemented and/or operated to amplify analog electrical signals communicated with the first antenna 34A, the second antenna 34B, the third antenna 34C, and/or the fourth antenna 34D. In fact, as in the examples depicted in FIGS. 21 and 22, implementing the first remote head 78A in this manner may obviate implementing a remote front-end integrated circuit 98 in the first remote head 78A, which, at least in some instances, may facilitate reducing implementation associated cost, such as physical footprint and/or component count.

Moreover, as in the depicted examples, the antenna integrated circuit 96 (e.g., first antenna integrated circuit 96A) of the first remote head 78A may be coupled between the first external terminal 176A, which may be coupled to the logic board 94, and the second external terminal 176B of the first remote head 78A. Additionally, as in the examples depicted in FIGS. 20 and 21, the second remote head 78B may additionally include a second antenna integrated circuit 96B coupled between the third external terminal 176C, which may be coupled to the second external terminal 176B of the first remote head 78A, and the remote front-end integrated circuit 98 (e.g., third remote front-end integrated circuit 98C) of the second remote head 78B. As described above, in some embodiments, analog electrical signals communicated between the second remote head 78B and the logic board 94 may be routed through the first remote head 78A. In other words, in such embodiments, analog electrical signals communicated between the antennas 34 of the second remote head 78B and the logic board 94 may be routed through the first antenna integrated circuit 96A of the first remote head 78A and the second antenna integrated circuit 96B of the second remote head 78B.

In fact, in some embodiments, operation of the first antenna integrated circuit 96A in the first remote head 78A may obviate operation of the second antenna integrated circuit 96B in the second remote head 78B, for example, due to a first filter 68 in the first antenna integrated circuit 96A targeting the same frequency band as a second filter 68 in the second antenna integrated circuit 96B. In such embodiments, as in the example depicted in FIG. 22, implementation of an additional antenna integrated circuit 96 in the second remote head 78B may be obviated, which, at least in some instances, may facilitate reducing implementation associated cost, such as physical footprint and/or component count. Instead, as in the depicted example, the remote front-end integrated circuit 98 of the second remote head 78B may be connected to the third external terminal 176C, for example, instead of an antenna integrated circuit 96.

As illustrated by the above examples, remote heads 78 implemented to support different antenna configurations may nevertheless include common circuitry features. To facilitate improving deployment (e.g., implementation) flexibility, in some embodiments, one or more of the common circuitry features may be implemented in a remote head system-in-package 160. For example, remote head system-in-packages 160 implemented in accordance with a first design may each include an antenna integrated circuit 96. As such, in some embodiments, instances of remote head system-in-packages 160 implemented using the first design may be included (e.g., deployed) in the remote head 78 of FIG. 16, the remote head 78 of FIG. 19, the first remote head 78A of FIG. 21, or the first remote head 78A of FIG. 22, or any combination thereof.

To help further illustrate, remote head system-in-packages 160 implemented in accordance with a second (e.g., different) design may each include an antenna integrated circuit 96 and a remote front-end integrated circuit 98. As such, in some embodiments, instances of remote head system-in-packages 160 implemented using the second design may be included in the remote head 78 of FIG. 17, the second remote head 78B of FIG. 20, the second remote head 78B of FIG. 21, or any combination thereof. For example, a first instance implemented using the second design may be included in the remote head 78 of FIG. 17, a second instance implemented using the second design may be included in the second remote head 78B of FIG. 20, and/or a third instance implemented using the second design may be included in the second remote head 78B of FIG. 21.

In fact, in some embodiments, a remote head system-in-package 160 including the antenna integrated circuit 96 and the remote front-end integrated circuit 98 may be used in a remote head 78 that includes multiple remote front-end integrated circuits 98. For example, instances of remote head system-in-packages 160 implemented using the second design along with an additional remote front-end integrated circuit 98 may be included in the remote head 78 of FIG. 18 and/or the first remote head 78A of FIG. 20. Additionally or alternatively, remote head system-in-packages 160 implemented in accordance with a third design may each include an antenna integrated circuit 96 and two remote front-end integrated circuits 98. As such, in some embodiments, instances of remote head system-in-packages 160 implemented using the third design may be included in the remote head 78 of FIG. 18 and/or the first remote head 78A of FIG. 20.

In this manner, the techniques described in the present disclosure may facilitate improving implementation flexibility and/or implementation associated cost of radio frequency systems, for example, via a system-in-package that includes circuitry features common between different antenna configurations, thereby enabling the same system-in-package design to be used to implement remote heads in the different antenna configurations. Moreover, the techniques described in the present disclosure may facilitate improving communication reliability and/or operational efficiency of radio frequency systems, for example, by enabling antennas to be positioned at disparate locations in an electronic device and/or enabling output power of an antenna to be controlled closer to the antenna. In other words, the technical effects (e.g., benefits and/or advantages) of the techniques described in the present disclosure include improving implementation flexibility, implementation associated cost, communication reliability, and/or operational efficiency of radio frequency systems and, thus, electronic devices in which the radio frequency systems are deployed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device having a radio frequency system, the radio frequency system comprising:

a logic board located in a first part of the electronic device and configured to output an analog electrical signal indicative of first data to be wirelessly transmitted from the radio frequency system via a first electrical connector; and a remote head that is remote from the logic board and located in a second part of the electronic device, wherein the remote head is coupled to the logic board via the first electrical connector and comprises:

an antenna configured to generate an electromagnetic wave to facilitate wirelessly transmitting the first data from the radio frequency system;

an antenna circuit board configured to receive the first data from the antenna;

an antenna integrated circuit configured to amplify the analog electrical signal received via the first electrical connector to generate an amplified analog electrical signal indicative of the first data; and an external terminal configured to enable wired communication from the remote head to external components external to the remote head based on the first data, wherein the external components comprise an external antenna that is external to the remote head.

2. The electronic device of claim 1, wherein the antenna integrated circuit comprises a power amplifier configured to apply a gain value to the analog electrical signal to generate the amplified analog electrical signal.

3. The electronic device of claim 1, wherein:

the logic board is configured to output a second analog electrical signal indicative of the first data to be wirelessly transmitted from the radio frequency system via a second electrical connector; and the radio frequency system comprises an additional remote head coupled to the logic board via the second electrical connector, the additional remote head comprising:

an additional antenna configured to generate an additional electromagnetic wave to facilitate wirelessly transmitting the first data from the radio frequency system;

an additional antenna integrated circuit configured to amplify an additional analog electrical signal received via the second electrical connector to generate an additional amplified analog electrical signal indicative of the first data; and a second external terminal configured to enable communication from the additional remote head based on the first data, wherein the communication from the additional remote head occurs between the additional remote head and external components external to the additional remote head.

4. The electronic device of claim 3, comprising phase shift circuitry configured to phase shift one or more analog electrical signals such that the amplified analog electrical signal is phase shifted to facilitate wirelessly transmitting the first data from the radio frequency system via an electromagnetic wave beam.

5. The electronic device of claim 3, wherein the remote head is positioned at a first end of the electronic device, and the additional remote head is positioned at a second end of the electronic device opposite the first end.

6. The electronic device of claim 5, wherein the logic board is positioned halfway between the first end and the second end of the electronic device.

7. The electronic device of claim 1, wherein the logic board is configured to output an additional analog electrical signal indicative of second data to be wirelessly transmitted from the antenna concurrently with the first data via a second electrical connector coupled between the logic board and the remote head.

8. The electronic device of claim 7, wherein the antenna integrated circuit is configured to amplify the additional analog electrical signal received via the second electrical connector to generate an additional amplified analog electrical signal indicative of the second data.

9. The electronic device of claim 1, wherein the logic board is configured to output a combined analog signal comprising the analog electrical signal indicative of the first data and an additional analog electrical signal indicative of second data to be wirelessly transmitted from the radio frequency system concurrently with the first data via the first electrical connector.

10. The electronic device of claim 9, wherein the antenna integrated circuit is configured to filter the combined analog electrical signal received via the first electrical connector to identify the analog electrical signal indicative of the first data and the additional analog electrical signal indicative of the second data and to amplify the additional analog electrical signal to generate an additional amplified analog electrical signal indicative of the second data.

11. The electronic device of claim 1, wherein the logic board comprises a transceiver integrated circuit configured to generate an additional analog electrical signal indicative of the first data at least in part by converting a digital electrical signal indicative of the first data from a digital domain to an analog domain.

12. The electronic device of claim 11, wherein the logic board comprises a driver integrated circuit coupled between the transceiver integrated circuit and the first electrical connector.

13. The electronic device of claim 12, wherein the driver integrated circuit is configured to amplify the additional analog electrical signal received from the transceiver integrated circuit to generate the analog electrical signal indicative of the first data.

14. The electronic device of claim 1, wherein the antenna integrated circuit comprises a plurality of amplifier units, wherein the amplifier units each comprises a power amplifier, a low noise amplifier, and one or more switching devices configured to selectively connect one of the power amplifier and the low noise amplifier to the antenna.

15. A method of implementing radio frequency circuitry in an electronic device comprising:

coupling a remote head to a logic board located in a first part of the electronic device, the logic board being configured to output a first analog electrical signal indicative of first data to be wirelessly transmitted over a first antenna through the remote head via a first electrical connector, wherein the remote head is remote from the logic board and located in a second part of the electronic device;

coupling an antenna integrated circuit of the remote head to the logic board;

receiving the first data from the first antenna at the antenna integrated circuit;

amplifying the first analog electrical signal using an amplifier of the antenna integrated circuit to generate an amplified analog electrical signal indicative of the first data; and transmitting, along a wired connection, the amplified analog electrical signal from the remote head to external components comprising an external antenna external to the remote head.

16. The method of claim 15, comprising:

determining, using control circuitry, a first target transmission power level for the first analog electrical signal to be transmitted via the first antenna; and applying, via the amplifier, a first gain level to the first analog electrical signal based at least in part on the first target transmission power level to generate the amplified analog electrical signal.

17. The method of claim 15, comprising:

instructing, using control circuitry, phase shift circuitry to phase shift the first analog electrical signal such that the amplified analog electrical signal and an additional amplified analog electrical signal are phase shifted relative to one another before supplying the amplified analog electrical signal to the first antenna; and instructing, using the control circuitry, routing circuitry implemented in the remote head to supply the amplified analog electrical signal to the first antenna.

18. The method of claim 17, comprising instructing, using the control circuitry, routing circuitry implemented in a second remote head to supply the additional amplified analog electrical signal to a second antenna to enable the radio frequency circuitry to wirelessly transmit via an electromagnetic wave beam.

19. An electronic device having a radio frequency system, the radio frequency system comprising:

a logic board located in a first part of the electronic device and configured to output a first analog electrical signal indicative of first data to be wirelessly transmitted from the radio frequency system via a first electrical connector and to output a second analog electrical signal indicative of second data to be wirelessly transmitted from the radio frequency system via a second electrical connector;

a first remote head that is remote from the logic board and located in a second part of the electronic device, wherein the first remote head is coupled to the logic board via the first electrical connector and comprises:

a first antenna configured to generate a first electromagnetic wave to facilitate wirelessly transmitting the first data from the radio frequency system;

a first antenna circuit board configured to receive the first data from the first antenna;

a first antenna integrated circuit configured to amplify the first analog electrical signal received via the first electrical connector to generate a first amplified analog electrical signal indicative of the first data; and a first external terminal configured to enable wired communication from the first remote head to first external components external to the first remote head based on the first data, wherein the first external components comprise an external antenna that is external to the first remote head; and a second remote head that is remote from the logic board and located in a third part of the electronic device, wherein the second remote head is coupled to the logic board via the second electrical connector and comprises:

a second antenna configured to generate a second electromagnetic wave to facilitate wirelessly transmitting the second data from the radio frequency system;

a second antenna circuit board configured to receive the second data from the second antenna;

a second antenna integrated circuit configured to amplify the second analog electrical signal received via the second electrical connector to generate a second amplified analog electrical signal indicative of the second data; and a second external terminal configured to enable communication from the second remote head based on the second data, the communication from the second remote head being performed between the second remote head and second external components external to the second remote head.

20. The electronic device of claim 19, wherein the first antenna integrated circuit comprises a first power amplifier configured to apply a first gain value to the first analog electrical signal to generate the first amplified analog electrical signal, and the second antenna integrated circuit comprises a second power amplifier configured to apply a second gain value to the second analog electrical signal to generate the second amplified analog electrical signal.

* * * * *